(12) United States Patent
Xie et al.

(10) Patent No.: US 11,290,985 B2
(45) Date of Patent: Mar. 29, 2022

(54) METHOD FOR RECEIVING INFORMATION, BASE STATION, AND TERMINAL

(71) Applicant: XI'AN ZHONGXING NEW SOFTWARE CO., LTD., Shaanxi (CN)

(72) Inventors: Feng Xie, Shenzhen (CN); Mingyue Wang, Shenzhen (CN); Gang Chen, Shenzhen (CN); Wei Luo, Shenzhen (CN); Liping Wang, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 60 days.

(21) Appl. No.: 16/328,052

(22) PCT Filed: Aug. 18, 2017

(86) PCT No.: PCT/CN2017/098089
§ 371 (c)(1),
(2) Date: Feb. 25, 2019

(87) PCT Pub. No.: WO2018/036433
PCT Pub. Date: Mar. 1, 2018

(65) Prior Publication Data
US 2019/0191416 A1 Jun. 20, 2019

(30) Foreign Application Priority Data
Aug. 25, 2016 (CN) .......................... 201610724703.8

(51) Int. Cl.
*H04W 4/00* (2018.01)
*H04W 72/04* (2009.01)

(52) U.S. Cl.
CPC ......... *H04W 72/04* (2013.01); *H04W 72/042* (2013.01)

(58) Field of Classification Search
CPC ........................... H04W 72/04; H04W 72/042
(Continued)

(56) References Cited

U.S. PATENT DOCUMENTS

| 2012/0093096 A1* | 4/2012 | Barbieri | H04J 3/1694 |
| | | | 370/329 |
| 2012/0275428 A1* | 11/2012 | Feng | H04L 5/0064 |
| | | | 370/330 |

(Continued)

FOREIGN PATENT DOCUMENTS

| CN | 101657017 A | 2/2010 |
| CN | 102067648 B | 6/2013 |

(Continued)

OTHER PUBLICATIONS

International Search Report and Written Opinion for PCT/CN2017/098089, dated Nov. 10, 2017.

*Primary Examiner* — Thai D Hoang
(74) *Attorney, Agent, or Firm* — Foley & Lardner LLP

(57) ABSTRACT

Disclosed are a method and apparatus for sending information, a method and apparatus for receiving information, a base station and a terminal. The method for sending information includes: configuring semi-persistent scheduling information for indicating N transmission opportunities in a semi-persistent scheduling period, where the N transmission opportunities include M transmission opportunities for transmitting data by a sending end, where N is an integer greater than 1, M is an integer, and 0<M≤N; and sending the configured semi-persistent scheduling information to a terminal. Through the present disclosure, the problem, in the related art, that the semi-persistent scheduling cannot meet the requirement of low latency is solved, and scheduling flexibility is improved.

17 Claims, 14 Drawing Sheets

(58) Field of Classification Search
USPC ................. 370/329–330, 335–345, 347–348
See application file for complete search history.

(56) References Cited

U.S. PATENT DOCUMENTS

| | | | | |
|---|---|---|---|---|
| 2013/0182653 | A1* | 7/2013 | Earnshaw | H04L 1/1822 370/329 |
| 2013/0301541 | A1* | 11/2013 | Mukherjee | H04W 74/0833 370/329 |
| 2013/0343265 | A1* | 12/2013 | Ehsan | H04J 3/0632 370/328 |
| 2014/0029471 | A1* | 1/2014 | Tavildar | H04W 48/16 370/255 |
| 2014/0106774 | A1* | 4/2014 | Siomina | H04W 64/00 455/456.1 |
| 2014/0177449 | A1* | 6/2014 | Novak | H04W 4/80 370/241 |
| 2014/0177542 | A1* | 6/2014 | Novak | H04W 72/042 370/329 |
| 2014/0241262 | A1* | 8/2014 | Novak | H04W 72/042 370/329 |
| 2015/0085775 | A1* | 3/2015 | Choi | H04W 74/002 370/329 |
| 2015/0282148 | A1* | 10/2015 | Le | H04W 72/0406 370/329 |
| 2016/0081114 | A1* | 3/2016 | Jung | H04W 72/04 370/329 |
| 2016/0366682 | A1* | 12/2016 | Tseng | H04W 72/0446 |
| 2017/0013565 | A1* | 1/2017 | Pelletier | H04W 52/343 |
| 2017/0026981 | A1* | 1/2017 | Cariou | H04W 72/0446 |
| 2017/0118792 | A1* | 4/2017 | Rico Alvarino | H04W 52/0225 |
| 2017/0202011 | A1* | 7/2017 | Trainin | H04W 52/0216 |
| 2017/0289733 | A1* | 10/2017 | Rajagopal | H04W 4/70 |
| 2018/0278373 | A1* | 9/2018 | Wang | H04L 1/1812 |
| 2018/0302825 | A1* | 10/2018 | Trainin | H04L 1/1835 |
| 2019/0045520 | A1* | 2/2019 | Venkatachalam Jayaraman | H04L 5/0092 |
| 2019/0082450 | A1* | 3/2019 | Ying | H04L 1/1822 |
| 2019/0166621 | A1* | 5/2019 | Yerramalli | H04W 74/004 |
| 2020/0245257 | A1* | 7/2020 | Pelletier | H04W 52/365 |
| 2020/0288482 | A1* | 9/2020 | Yi | H04W 72/121 |

FOREIGN PATENT DOCUMENTS

| | | |
|---|---|---|
| WO | WO-2009137647 A1 | 11/2009 |
| WO | WO-2016127648 A1 | 8/2016 |

* cited by examiner

METHOD FOR RECEIVING INFORMATION, BASE STATION, AND TERMINAL

CROSS REFERENCE TO RELATED APPLICATIONS

This is a National Stage Application, filed under 35 U.S.C. 371, of International Patent Application No. PCT/CN2017/098089, filed on Aug. 18, 2017, which claims priority to Chinese Patent Application No. 201610724703.8 filed on Aug. 25, 2016, contents of both of which are incorporated herein by reference in their entireties.

TECHNICAL FIELD

The present disclosure relates to the technical field of communications and, in particular, to a method and apparatus for sending information, a method and apparatus for receiving information, a base station and a terminal.

BACKGROUND

Wireless systems have an increasingly high and urgent requirement for air interfaces and end-to-end latency. For the ultra reliable & low latency communication (URLLC) traffic, the size of the data packet is relatively fixed, and the interval between arrival times of the data packets is also regular. For example, in unmanned driving, industrial control and other applications, the data sent is mostly control information, and has a small amount, but has a very high real-time requirement. For traffic with multi-user, low latency, and small data amount, the overhead of control channels is a key factor limiting the system capacity. Therefore, a semi-persistent scheduling mode may be used to increase system capacity. In the conventional semi-persistent scheduling mode, a large waiting latency is caused when an offset exists between traffic data arrival and the semi-persistent scheduled subframe.

For the above technical problem in the related art, no effective solution has yet been proposed.

SUMMARY

Embodiments of the present disclosure provide a method and apparatus for sending information, a method and apparatus for receiving information, a base station and a terminal, to at least solve the problem in the related art that the semi-persistent scheduling (SPS) cannot meet the low latency requirement.

An embodiment of the present disclosure provides a method for sending information, including: configuring semi-persistent scheduling information for indicating N transmission opportunities in a semi-persistent scheduling period, and sending the configured semi-persistent scheduling information to a terminal. The N transmission opportunities include M transmission opportunities for transmitting data by a sending end, where N is an integer greater than 1, M is an integer, and 0<M≤N.

In the embodiment of the present disclosure, the M transmission opportunities are selected from the N transmission opportunities by the sending end. The sending end is a base station or a terminal.

In the embodiment of the present disclosure, a value of M is at least one of: a constant, configured by a system, and determined by the sending end.

In the embodiment of the present disclosure, the semi-persistent scheduling information further includes indication information for indicating a transmission opportunity window, where the N transmission opportunities are within the transmission opportunity window.

In the embodiment of the present disclosure, the semi-persistent scheduling information includes one of: a starting position of the transmission opportunity window; the starting position of the transmission opportunity window and a length of the transmission opportunity window; the starting position of the transmission opportunity window, the length of the transmission opportunity window and a transmission opportunity interval; the starting position of the transmission opportunity window, the length of the transmission opportunity window and the number of transmission opportunities; the starting position of the transmission opportunity window, the transmission opportunity interval and the number of transmission opportunities; the starting position of the transmission opportunity window, a transmission opportunity starting position in the transmission opportunity window and the length of the transmission opportunity window; the starting position of the transmission opportunity window, the transmission opportunity starting position in the transmission opportunity window, the length of the transmission opportunity window and the transmission opportunity interval; the starting position of the transmission opportunity window, the transmission opportunity starting position in the transmission opportunity window, the length of the transmission opportunity window and the number of transmission opportunities; and the starting position of the transmission opportunity window, the transmission opportunity starting position in the transmission opportunity window, the transmission opportunity interval and the number of transmission opportunities.

In the embodiment of the present disclosure, the semi-persistent scheduling information includes: a transmission opportunity indication bitmap; or includes a starting position of a transmission opportunity window and the transmission opportunity indication bitmap.

In the embodiment of the present disclosure, the semi-persistent scheduling information includes one or more transmission opportunity starting positions for the N transmission opportunities, or includes one or more transmission opportunity starting positions for the N transmission opportunities and at least one of: a transmission opportunity interval; and the number of the transmission opportunities.

In the embodiment of the present disclosure, the semi-persistent scheduling information includes a plurality of transmission opportunity starting positions, and each of the plurality of transmission opportunity starting positions is used for indicating one transmission opportunity or a set of consecutive transmission opportunities among the N transmission opportunities.

In the embodiment of the present disclosure, the N transmission opportunities are at least one of: N consecutive transmission opportunities; N non-consecutive transmission opportunities; N consecutive transmission opportunities in one transmission opportunity window; N transmission opportunities periodically distributed in one transmission opportunity window; and N non-consecutive transmission opportunities in one transmission opportunity window.

In the embodiment of the present disclosure, the semi-persistent scheduling information further includes at least one of: adjustment information of a starting position of the N transmission opportunities, and adjustment information of a transmission opportunity window.

In the embodiment of the present disclosure, the semi-persistent scheduling information further includes semi-persistent scheduling activation information for indicating activation, deactivation, reactivation, or release of a part of or all of the N transmission opportunities.

In the embodiment of the present disclosure, (N−M) transmission opportunities, among the N transmission opportunities and other than the M transmission opportunities, include a transmission opportunity for sending a reference signal; or the (N−M) transmission opportunities do not include the transmission opportunity for sending the reference signal.

In the embodiment of the present disclosure, in determining that the (N−M) transmission opportunities include the transmission opportunity for sending the reference signal and the (N−M) transmission opportunities include a first transmission opportunity of the N transmission opportunities, the first transmission opportunity is used for sending the reference signal.

In the embodiment of the present disclosure, the semi-persistent scheduling information is sent to the terminal in one of the following manners: radio resource control (RRC) protocol signaling, downlink control information (DCI), and a media access control (MAC) message.

An embodiment of the present disclosure provides a method for receiving information, including: receiving semi-persistent scheduling information for indicating N transmission opportunities in a semi-persistent scheduling period sent by a network side. The N transmission opportunities include M transmission opportunities for transmitting data by a sending end, where N is an integer greater than 1, M is an integer, and 0<M≤N.

In the embodiment of the present disclosure, the M transmission opportunities are selected from the N transmission opportunities by the sending end.

In the embodiment of the present disclosure, a value of M is at least one of: a constant, configured by a system, and determined by the sending end.

In the embodiment of the present disclosure, the semi-persistent scheduling information further includes indication information for indicating a transmission opportunity window, where the N transmission opportunities are within the transmission opportunity window.

In the embodiment of the present disclosure, the semi-persistent scheduling information includes one of: a starting position of the transmission opportunity window; the starting position of the transmission opportunity window and a length of the transmission opportunity window; the starting position of the transmission opportunity window, the length of the transmission opportunity window and a transmission opportunity interval; the starting position of the transmission opportunity window, the length of the transmission opportunity window and the number of transmission opportunities; the starting position of the transmission opportunity window, the transmission opportunity interval and the number of transmission opportunities; the starting position of the transmission opportunity window, a transmission opportunity starting position in the transmission opportunity window and the length of the transmission opportunity window; the starting position of the transmission opportunity window, the transmission opportunity starting position in the transmission opportunity window, the length of the transmission opportunity window and the transmission opportunity interval; the starting position of the transmission opportunity window, the transmission opportunity starting position in the transmission opportunity window, the length of the transmission opportunity window and the number of transmission opportunities; and the starting position of the transmission opportunity window, the transmission opportunity starting position in the transmission opportunity window, the transmission opportunity interval and the number of transmission opportunities.

In the embodiment of the present disclosure, the semi-persistent scheduling information includes: a transmission opportunity indication bitmap; or a starting position of a transmission opportunity window and the transmission opportunity indication bitmap.

In the embodiment of the present disclosure, the semi-persistent scheduling information includes one or more transmission opportunity starting positions, or includes one or more transmission opportunity starting positions for the N transmission opportunities and at least one of: a transmission opportunity interval; and the number of the transmission opportunities.

In the embodiment of the present disclosure, the semi-persistent scheduling information includes a plurality of transmission opportunity starting positions, and each of the plurality of transmission opportunity starting positions is used for indicating one transmission opportunity or a set of consecutive transmission opportunities among the N transmission opportunities.

In the embodiment of the present disclosure, the semi-persistent scheduling information further includes at least one of: adjustment information of a starting position of the N transmission opportunities, and adjustment information of a transmission opportunity window.

In the embodiment of the present disclosure, the semi-persistent scheduling information further includes semi-persistent scheduling activation information for indicating activation, deactivation, reactivation, or release of a part of or all of the plurality of transmission opportunities.

In the embodiment of the present disclosure, (N−M) transmission opportunities, among the N transmission opportunities and other than the M transmission opportunities, include a transmission opportunity for sending a reference signal; or the (N−M) transmission opportunities do not include the transmission opportunity for sending the reference signal.

In the embodiment of the present disclosure, in determining that the (N−M) transmission opportunities include the transmission opportunity for sending the reference signal and the (N−M) transmission opportunities include a first transmission opportunity of the N transmission opportunities, the first transmission opportunity is used for sending the reference signal.

In the embodiment of the present disclosure, the semi-persistent scheduling information is received in one of the following manners: radio resource control (RRC) protocol signaling, downlink control information (DCI), and a media access control (MAC) message.

An embodiment of the present disclosure provides an apparatus for sending information, including: a configuring module, which is configured to configure semi-persistent scheduling information for indicating N transmission opportunities in a semi-persistent scheduling period, where the N transmission opportunities include M transmission opportunities for transmitting data by a sending end, where N is an integer greater than 1, M is an integer, and 0<M≤N; and a sending module, which is configured to send the configured semi-persistent scheduling information to a terminal.

In the embodiment of the present disclosure, the M transmission opportunities are selected from the N transmission opportunities by the sending end.

In the embodiment of the present disclosure, a value of M is at least one of: a constant, configured by a system, and determined by the sending end.

In the embodiment of the present disclosure, the semi-persistent scheduling information further includes indication information for indicating a transmission opportunity window, where the N transmission opportunities are within the transmission opportunity window.

In the embodiment of the present disclosure, the semi-persistent scheduling information includes one of: a starting position of the transmission opportunity window; the starting position of the transmission opportunity window and a length of the transmission opportunity window; the starting position of the transmission opportunity window, the length of the transmission opportunity window and a transmission opportunity interval; the starting position of the transmission opportunity window, the length of the transmission opportunity window and the number of transmission opportunities; the starting position of the transmission opportunity window, the transmission opportunity interval and the number of transmission opportunities; the starting position of the transmission opportunity window, a transmission opportunity starting position in the transmission opportunity window and the length of the transmission opportunity window; the starting position of the transmission opportunity window, the transmission opportunity starting position in the transmission opportunity window, the length of the transmission opportunity window and the transmission opportunity interval; the starting position of the transmission opportunity window, the transmission opportunity starting position in the transmission opportunity window, the length of the transmission opportunity window and the number of transmission opportunities; and the starting position of the transmission opportunity window, the transmission opportunity starting position in the transmission opportunity window, the transmission opportunity interval and the number of transmission opportunities.

In the embodiment of the present disclosure, the semi-persistent scheduling information includes one of: a transmission opportunity indication bitmap; and a starting position of a transmission opportunity window and the transmission opportunity indication bitmap.

In the embodiment of the present disclosure, the semi-persistent scheduling information includes one or more transmission opportunity starting positions, or includes one or more transmission opportunity starting positions for the N transmission opportunities and at least one of: a transmission opportunity interval; and the number of the transmission opportunities.

In the embodiment of the present disclosure, the semi-persistent scheduling information includes a plurality of transmission opportunity starting positions, and each of the plurality of transmission opportunity starting positions is used for indicating one transmission opportunity or a set of consecutive transmission opportunities among the N transmission opportunities.

In the embodiment of the present disclosure, the semi-persistent scheduling information further includes at least one of: adjustment information of a starting position of the plurality of transmission opportunities, and adjustment information of a transmission opportunity window.

In the embodiment of the present disclosure, the semi-persistent scheduling information further includes semi-persistent scheduling activation information for indicating activation, deactivation, reactivation, or release of a part of or all of the N transmission opportunities.

In the embodiment of the present disclosure, (N−M) transmission opportunities, among the N transmission opportunities and other than the M transmission opportunities, include a transmission opportunity for sending a reference signal; or the (N−M) transmission opportunities do not include the transmission opportunity for sending the reference signal.

In the embodiment of the present disclosure, in determining that the (N−M) transmission opportunities include the transmission opportunity for sending the reference signal and the (N−M) transmission opportunities include a first transmission opportunity of the N transmission opportunities, the first transmission opportunity is used for sending the reference signal.

An embodiment of the present disclosure provides an apparatus for receiving information, including: a receiving module, which is configured to receive semi-persistent scheduling information for indicating N transmission opportunities in a semi-persistent scheduling period sent by a network side, where the N transmission opportunities include M transmission opportunities for transmitting data by a sending end, where N is an integer greater than 1, M is an integer, and 0<M≤N.

In the embodiment of the present disclosure, the M transmission opportunities are selected from the N transmission opportunities by the sending end.

In the embodiment of the present disclosure, a value of M is at least one of: a constant, configured by a system, and determined by the sending end.

In the embodiment of the present disclosure, the semi-persistent scheduling information further includes indication information for indicating a transmission opportunity window, where the N transmission opportunities are within the transmission opportunity window.

In the embodiment of the present disclosure, the semi-persistent scheduling information includes one of: a starting position of the transmission opportunity window; the starting position of the transmission opportunity window and a length of the transmission opportunity window; the starting position of the transmission opportunity window, the length of the transmission opportunity window and a transmission opportunity interval; the starting position of the transmission opportunity window, the length of the transmission opportunity window and the number of transmission opportunities; the starting position of the transmission opportunity window, the transmission opportunity interval and the number of transmission opportunities; the starting position of the transmission opportunity window, a transmission opportunity starting position in the transmission opportunity window and the length of the transmission opportunity window; the starting position of the transmission opportunity window, the transmission opportunity starting position in the transmission opportunity window, the length of the transmission opportunity window and the transmission opportunity interval; the starting position of the transmission opportunity window, the transmission opportunity starting position in the transmission opportunity window, the length of the transmission opportunity window and the number of transmission opportunities; and the starting position of the transmission opportunity window, the transmission opportunity starting position in the transmission opportunity window, the transmission opportunity interval and the number of transmission opportunities.

In the embodiment of the present disclosure, the semi-persistent scheduling information includes: a transmission opportunity indication bitmap; or includes: a starting position of a transmission opportunity window and the transmission opportunity indication bitmap.

In the embodiment of the present disclosure, the semi-persistent scheduling information includes one or more transmission opportunity starting positions, or includes one or more transmission opportunity starting positions for the N transmission opportunities and at least one of: a transmission opportunity interval; and the number of the transmission opportunities.

In the embodiment of the present disclosure, the semi-persistent scheduling information includes a plurality of transmission opportunity starting positions, and each of the plurality of transmission opportunity starting positions is used for indicating one transmission opportunity or a set of consecutive transmission opportunities among the N transmission opportunities.

In the embodiment of the present disclosure, the semi-persistent scheduling information further includes at least one of: adjustment information of a starting position of the N transmission opportunities, and adjustment information of a transmission opportunity window.

In the embodiment of the present disclosure, the semi-persistent scheduling information further includes semi-persistent scheduling activation information for indicating activation, deactivation, reactivation, or release of a part of or all of the plurality of transmission opportunities.

In the embodiment of the present disclosure, (N−M) transmission opportunities, among the N transmission opportunities and other than the M transmission opportunities, include a transmission opportunity for sending a reference signal; or the (N−M) transmission opportunities do not include the transmission opportunity for sending the reference signal.

In the embodiment of the present disclosure, in determining that the (N−M) transmission opportunities include the transmission opportunity for sending the reference signal and the (N−M) transmission opportunities include a first transmission opportunity of the N transmission opportunities, the first transmission opportunity is used for sending the reference signal.

An embodiment of the present disclosure provides a base station, including: a processor, which is configured to configure semi-persistent scheduling information for indicating N transmission opportunities in a semi-persistent scheduling period, where the N transmission opportunities include M transmission opportunities for transmitting data by a sending end, where N is an integer greater than 1, M is an integer, and 0<M≤N; and a transmission apparatus, which is configured to send the configured semi-persistent scheduling information to a terminal.

In the embodiment of the present disclosure, the M transmission opportunities are selected from the N transmission opportunities by the sending end.

In the embodiment of the present disclosure, a value of M is at least one of: a constant, configured by a system, and determined by the sending end.

In the embodiment of the present disclosure, the semi-persistent scheduling information further includes indication information for indicating a transmission opportunity window, where the N transmission opportunities are within the transmission opportunity window.

In the embodiment of the present disclosure, the semi-persistent scheduling information includes one of: a starting position of the transmission opportunity window; the starting position of the transmission opportunity window and a length of the transmission opportunity window; the starting position of the transmission opportunity window, the length of the transmission opportunity window and a transmission opportunity interval; the starting position of the transmission opportunity window, the length of the transmission opportunity window and the number of transmission opportunities; the starting position of the transmission opportunity window, the transmission opportunity interval and the number of transmission opportunities; the starting position of the transmission opportunity window, a transmission opportunity starting position in the transmission opportunity window and the length of the transmission opportunity window; the starting position of the transmission opportunity window, the transmission opportunity starting position in the transmission opportunity window, the length of the transmission opportunity window and the transmission opportunity interval; the starting position of the transmission opportunity window, the transmission opportunity starting position in the transmission opportunity window, the length of the transmission opportunity window and the number of transmission opportunities; and the starting position of the transmission opportunity window, the transmission opportunity starting position in the transmission opportunity window, the transmission opportunity interval and the number of transmission opportunities.

In the embodiment of the present disclosure, the semi-persistent scheduling information includes: a transmission opportunity indication bitmap; and a starting position of a transmission opportunity window and the bitmap indication of the transmission opportunities.

In the embodiment of the present disclosure, the semi-persistent scheduling information includes one or more transmission opportunity starting positions, or includes one or more transmission opportunity starting positions for the N transmission opportunities and at least one of: a transmission opportunity interval; and the number of the transmission opportunities.

In the embodiment of the present disclosure, the semi-persistent scheduling information includes a plurality of transmission opportunity starting positions, and each of the plurality of transmission opportunity starting positions is used for indicating one transmission opportunity or a set of consecutive transmission opportunities among the N transmission opportunities.

In the embodiment of the present disclosure, (N−M) transmission opportunities, among the N transmission opportunities and other than the M transmission opportunities, include a transmission opportunity for sending a reference signal; or the (N−M) transmission opportunities do not include the transmission opportunity for sending the reference signal.

In the embodiment of the present disclosure, in determining that the (N−M) transmission opportunities include the transmission opportunity for sending the reference signal and the (N−M) transmission opportunities include a first transmission opportunity of the N transmission opportunities, the first transmission opportunity is used for sending the reference signal.

An embodiment of the present disclosure provides a terminal, including: a transmission apparatus, which is configured to receive semi-persistent scheduling information for indicating N transmission opportunities in a semi-persistent scheduling period sent by a network side, where the N transmission opportunities include M transmission opportunities for transmitting data by a sending end, where N is an integer greater than 1, M is an integer, and 0<M≤N.

In the embodiment of the present disclosure, the M transmission opportunities are selected from the N transmission opportunities by the sending end.

In the embodiment of the present disclosure, a value of M is at least one of: a constant, configured by a system, and determined by the sending end.

In the embodiment of the present disclosure, the semi-persistent scheduling information further includes indication information for indicating a transmission opportunity window, where the N transmission opportunities are within the transmission opportunity window.

In the embodiment of the present disclosure, the semi-persistent scheduling information includes one of: a starting position of the transmission opportunity window; the starting position of the transmission opportunity window and a length of the transmission opportunity window; the starting position of the transmission opportunity window, the length of the transmission opportunity window and a transmission opportunity interval; the starting position of the transmission opportunity window, the length of the transmission opportunity window and the number of transmission opportunities; the starting position of the transmission opportunity window, the transmission opportunity interval and the number of transmission opportunities; the starting position of the transmission opportunity window, a transmission opportunity starting position in the transmission opportunity window and the length of the transmission opportunity window; the starting position of the transmission opportunity window, the transmission opportunity starting position in the transmission opportunity window, the length of the transmission opportunity window and the transmission opportunity interval; the starting position of the transmission opportunity window, the transmission opportunity starting position in the transmission opportunity window, the length of the transmission opportunity window and the number of transmission opportunities; and the starting position of the transmission opportunity window, the transmission opportunity starting position in the transmission opportunity window, the transmission opportunity interval and the number of transmission opportunities.

In the embodiment of the present disclosure, the semi-persistent scheduling information includes: a transmission opportunity indication bitmap; or includes a starting position of a transmission opportunity window and the transmission opportunity indication bitmap.

In the embodiment of the present disclosure, the semi-persistent scheduling information includes one or more transmission opportunity starting positions, or includes one or more transmission opportunity starting positions for the N transmission opportunities and at least one of: a transmission opportunity interval; and the number of the transmission opportunities.

In the embodiment of the present disclosure, the semi-persistent scheduling information includes a plurality of transmission opportunity starting positions, and each of the plurality of transmission opportunity starting positions is used for indicating one transmission opportunity or a set of consecutive transmission opportunities among the N transmission opportunities.

In the embodiment of the present disclosure, (N−M) transmission opportunities, among the N transmission opportunities and other than the M transmission opportunities, include a transmission opportunity for sending a reference signal; or the (N−M) transmission opportunities do not include the transmission opportunity for sending the reference signal.

In the embodiment of the present disclosure, in determining that the (N−M) transmission opportunities include the transmission opportunity for sending the reference signal and the (N−M) transmission opportunities include a first transmission opportunity of the N transmission opportunities, the first transmission opportunity is used for sending the reference signal.

Another embodiment of the present disclosure provides a storage medium. The storage medium includes stored programs which, when executed, perform the method of any one of the embodiments described above.

Another embodiment of the present disclosure provides a processor. The processor is used for executing programs, which, when executed, perform the method of any one of the embodiments described above.

In the present disclosure, the semi-persistent scheduling information for indicating N transmission opportunities in a semi-persistent scheduling period is sent to the terminal, so that the configured SPS scheduling period includes a plurality of transmission opportunities, and the terminal can use the M transmission opportunities to send data or detect whether corresponding downlink traffic exists. Compared with the existing art in which an SPS scheduling period includes one transmission opportunity, the latency in the SPS scheduling can be reduced, so that the problem that the semi-persistent scheduling cannot meet the low latency requirement in the existing art can be solved, and scheduling flexibility is improved.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure and do not limit the present disclosure in any improper way. In the drawings.

DETAILED DESCRIPTION

The present disclosure will be described hereinafter in detail with reference to the drawings and in conjunction with the embodiments. It should be noted that if not in collision, the embodiments and features therein in the present application may be combined with each other.

It is to be noted that the terms "first", "second" and the like in the description, claims and above accompanying drawings of the present disclosure are used to distinguish between similar objects and are not necessarily used to describe a particular order or sequence.

Embodiment 1

Figure 1:
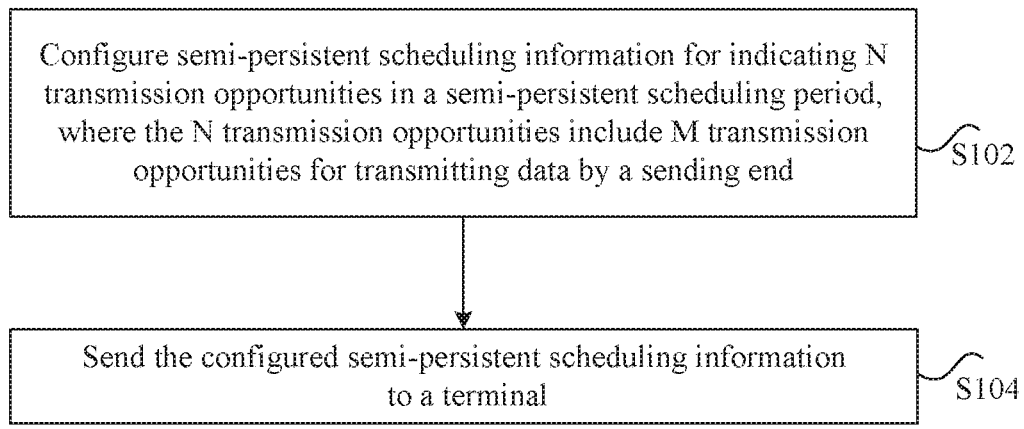
FIG. 1 is a flowchart of a method for sending information according to an embodiment of the present disclosure.

The embodiment of the present disclosure provides a method for sending information. FIG. 1 is a flowchart of the method for sending information according to the embodiment of the present disclosure. As shown in FIG. 1, the method includes the steps described below.

In step S102, semi-persistent scheduling information for indicating N transmission opportunities in a semi-persistent scheduling period is configured. The N transmission opportunities include M transmission opportunities for transmitting data by a sending end. N is an integer greater than 1, M is an integer, and 0<M≤N.

In step S104, the configured semi-persistent scheduling information is sent to a terminal.

With the steps described above, the semi-persistent scheduling information for indicating N transmission opportunities in a semi-persistent scheduling period is sent to the terminal, so that the configured SPS scheduling period includes a plurality of transmission opportunities and the terminal can flexibly use the M transmission opportunities to send data or detect whether corresponding downlink traffic exists. Compared with the existing art in which the SPS scheduling period has one transmission opportunity, the method provided herein can directly select the next transmission opportunity, without waiting for a transmission opportunity in the next SPS scheduling period, to send data or detect whether corresponding downlink traffic exists when time dithering or offset (drift) occurs on the traffic data arrival. Thus the latency due to traffic data waiting in the SPS scheduling can be reduced, the problem that the semi-persistent scheduling cannot meet the requirement of low latency in the related art can be solved, and scheduling flexibility is improved.

It should be noted that the sending end described above may be, but is not limited to, a base station or a terminal.

It should be noted that the M transmission opportunities may be selected from the N transmission opportunities by the sending end. A value of M is at least one of: a constant, configured by a system, and determined by the sending end.

It should be noted that the N transmission opportunities may include: a redundant transmission opportunity. The redundant transmission opportunity may be the remaining transmission opportunities among the N transmission opportunities other than the M transmission opportunities. That is, the N transmission opportunities may include transmission opportunities not for transmitting data. For example, if one semi-persistent scheduling period includes three transmission opportunities, one of the three transmission opportunities is used for the terminal to transmit data, and the other two transmission opportunities are not used for the terminal to transmit data; or two of the three transmission opportunities are used for the terminal to transmit data, and the remaining one transmission opportunity is not used for transmitting data, but the present disclosure is not limited thereto.

It should be noted that the M transmission opportunities may be used for transmitting different data. For example, three transmission opportunities are in one semi-persistent scheduling period, and two of the three transmission opportunities are used for the terminal to transmit data, while the two transmission opportunities are used to transmit different data, but the present disclosure are not limited thereto.

It should be noted that if the N transmission opportunities include the redundant transmission opportunity, the M transmission opportunities may transmit different redundancy versions of the same data.

In an embodiment of the present disclosure, the semi-persistent scheduling information may further include indication information for indicating a transmission opportunity window. The N transmission opportunities are within the transmission opportunity window.

It should be noted that, the semi-persistent scheduling information may include one of: a starting position of the transmission opportunity window; the starting position of the transmission opportunity window and a length of the transmission opportunity window; the starting position of the transmission opportunity window, the length of the transmission opportunity window and a transmission opportunity interval; the starting position of the transmission opportunity window, the length of the transmission opportunity window and the number of transmission opportunities; the starting position of the transmission opportunity window, the transmission opportunity interval and the number of transmission opportunities; the starting position of the transmission opportunity window, a transmission opportunity starting position in the transmission opportunity window and the length of the transmission opportunity window; the starting position of the transmission opportunity window, the transmission opportunity starting position in the transmission opportunity window, the length of the transmission opportunity window and the transmission opportunity interval; the starting position of the transmission opportunity window, the transmission opportunity starting position in the transmission opportunity window, the length of the transmission opportunity window and the number of transmission opportunities; and the starting position of the transmission opportunity window, the transmission opportunity starting position in the transmission opportunity window, the transmission opportunity interval and the number of transmission opportunities. That is, the above information may be used for indicating the distribution of the transmission opportunities in a semi-persistent scheduling period.

It should be noted that the transmission opportunity interval described above may represent, but is not limited to, an interval of N transmission opportunities in a semi-persistent scheduling period.

It should be noted that in the case where the semi-persistent scheduling information includes the starting position of the transmission opportunity window, the N transmission opportunities may be indicated by the starting position of the transmission opportunity window and a fixed window length (greater than 1), but the present disclosure is not limited thereto. It should be noted that the fixed window length may be preset by the sending end and the receiving end through a protocol.

In the embodiment of the present disclosure, the semi-persistent scheduling information may include: bitmap indication of the transmission opportunities; or a starting position of a transmission opportunity window and the bitmap indication of the transmission opportunities.

In the embodiment of the present disclosure, the semi-persistent scheduling information includes one or more transmission opportunity starting positions. Alternatively, the semi-persistent scheduling information includes one or more transmission opportunity starting positions for the N transmission opportunities and at least one of: a transmission opportunity interval and the number of the transmission opportunities.

It should be noted that the semi-persistent scheduling information includes a plurality of transmission opportunity starting positions, and each of the plurality of transmission opportunity starting positions is used for indicating one transmission opportunity or a set of consecutive transmission opportunities among the N transmission opportunities.

In the embodiment of the present disclosure, the N transmission opportunities may be in at least one of the following manners: N consecutive transmission opportunities; N non-consecutive transmission opportunities; N consecutive transmission opportunities in one transmission opportunity window; N transmission opportunities periodically distributed in one transmission opportunity window; and N non-consecutive transmission opportunities in one transmission opportunity window.

It should be noted that the arranging manner of the multiple transmission opportunities may be indicated by the semi-persistent scheduling information.

It should be noted that the semi-persistent scheduling information may further include at least one of: adjustment information for a starting position of the N transmission opportunities, and adjustment information for a transmission opportunity window.

It should be noted that the semi-persistent scheduling information may further include semi-persistent scheduling activation information for indicating activation, deactivation, reactivation, or release of a part of or all of the N transmission opportunities.

In the embodiment of the present disclosure, (N−M) transmission opportunities, among the N transmission opportunities and other than the M transmission opportunities, include a transmission opportunity for sending a reference signal; or the (N−M) transmission opportunities do not include the transmission opportunity for sending the reference signal.

It should be noted that, in determining that the (N−M) transmission opportunities include the transmission opportunity for sending the reference signal and the (N−M) transmission opportunities include a first transmission opportunity of the N transmission opportunities, the first transmission opportunity is used for sending the reference signal.

In the embodiment of the present disclosure, the semi-persistent scheduling information is sent to the terminal though one of: radio resource control (RRC) protocol signaling, downlink control information (DCI), and a media access control (MAC) message.

In the embodiment of the present disclosure, the step S102 described above may be: configuring the semi-persistent scheduling information according to the terminal traffic type or the network side traffic type.

It should be noted that the network side traffic type may be obtained by parsing a Quality of Service (QoS) Class Identifier (QCI) in a bearer setup request message; or, the terminal traffic type is obtained from the terminal, but the present disclosure is not limited thereto.

It should be noted that the above-mentioned steps may, but are not limited to, be executed by a network side device, such as a base station.

It should be noted that the transmission opportunity may also, but is not limited to, be a transmission subframe or a transmission time interval (TTI).

From the description of the embodiment described above, it will be apparent to those skilled in the art that the method in the embodiment described above may be implemented by software plus a necessary general-purpose hardware platform, or may of course be implemented by hardware. However, in many cases, the former is a preferred implementation mode. Based on this understanding, the solution provided by the present disclosure substantially, or the part contributing to the related art, may be embodied in the form of a software product. The computer software product is stored in a storage medium (such as an ROM/RAM, a magnetic disk or an optical disk) and includes several instructions for enabling a terminal device (which may be a mobile phone, a computer, a server, a network device, or the like) to execute the method according to each embodiment of the present disclosure.

Embodiment 2

Figure 2:
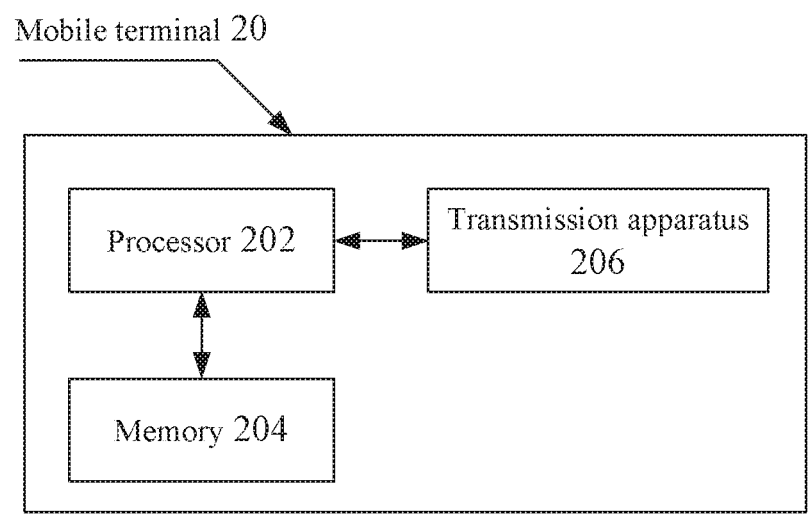
FIG. 2 is a block diagram illustrating a hardware structure of a mobile terminal for a method for receiving information according to an embodiment of the present disclosure.

The method embodiment provided by the embodiment 2 of the present application may be executed on a mobile terminal, a computer terminal or other similar computing apparatuses. An example is described below in which the method is executed on the mobile terminal. FIG. 2 is a block diagram illustrating a hardware structure of a mobile terminal executing a method for receiving information according to the embodiment of the present disclosure. As shown in FIG. 2, a mobile terminal 20 may include one or more (only one is shown in FIG. 2) processors 202 (in which the processor 202 may include, but is not limited to, a microcontroller unit (MCU), a programmable logic device such as field-programmable gate array (FPGA), or other processing apparatuses), a memory 204 used for storing data, and a transmission apparatus 206 used for implementing a communication function. It should be understood by those of ordinary skill in the art that the structure shown in FIG. 2 is merely illustrative and not intended to limit the structure of the electronic apparatus described above. For example, the mobile terminal 20 may further include more or fewer components than the components shown in FIG. 2 or may have a configuration different from the configuration shown in FIG. 2.

The memory 204 may be used for storing software programs and modules of application software, such as program instructions/modules corresponding to the method for receiving information in the embodiments of the present disclosure. The processor 202 executes the software programs and modules stored in the memory 204 so as to perform various function applications and data processing, that is, to implement the method described above. The memory 204 may include a high-speed random access memory, and may further include a nonvolatile memory, such as one or more magnetic storage apparatuses, flash memories or other nonvolatile solid-state memories. In some examples, the memory 204 may further include memories that are remotely disposed with respect to the processor 202. These remote memories may be connected to the mobile terminal 20 via a network. Examples of the network described above include, but are not limited to, the Internet, an intranet, a local area network, a mobile communication network and a combination thereof.

The transmission apparatus 206 is used for receiving or sending data via a network. Specific examples of such a network may include a wireless network provided by a communication provider of the mobile terminal 20. In one example, the transmission apparatus 206 includes a network interface controller (NIC), which may be connected to other network devices via a base station and thus be capable of communicating with the Internet. In one example, the transmission apparatus 206 may be a radio frequency (RF) module, which is used for communicating with the Internet in a wireless way.

Figure 3:
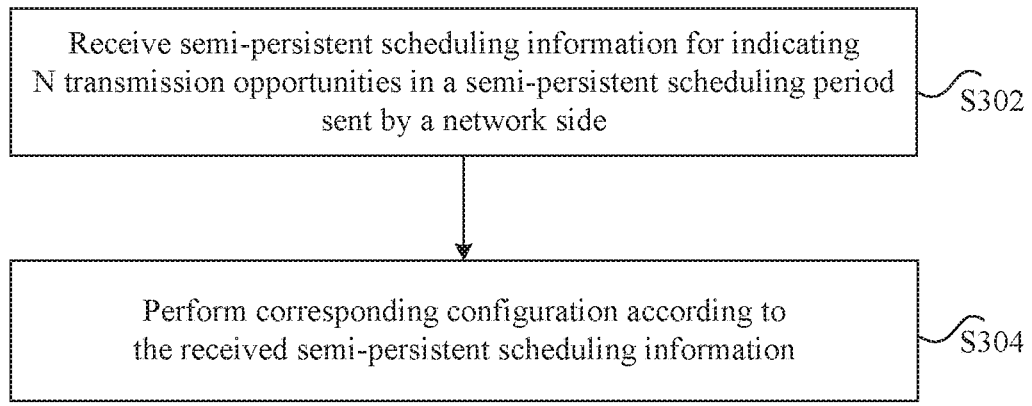
FIG. 3 is a flowchart of the method for receiving information according to the embodiment of the present disclosure.

The present embodiment provides a method for receiving information executed on the mobile terminal described above. FIG. 3 is a flowchart of the method for receiving information according to the embodiment of the present disclosure. As shown in FIG. 3, the method includes the steps described below.

In step S302, semi-persistent scheduling information sent by a network side is received, where the semi-persistent scheduling information is used for indicating N transmission opportunities in a semi-persistent scheduling period. The N transmission opportunities include M transmission opportunities for transmitting data by a sending end. N is an integer greater than 1, M is an integer, and $0 < M \leq N$.

In step S304, corresponding configuration is performed according to the received semi-persistent scheduling information.

With the steps described above, the semi-persistent scheduling information for indicating N transmission opportunities in a semi-persistent scheduling period sent by a network side is received, so that the terminal can flexibly use the M transmission opportunities to send data or detect whether corresponding downlink traffic exists. Compared with the existing art in which the SPS scheduling period includes one transmission opportunity, when time dithering or offset (drift) occurs on the traffic data arrival, the method provided herein can directly select the next transmission opportunity, without waiting for a transmission opportunity in the next SPS scheduling period, to send data or detect whether the corresponding downlink traffic exists. Thus the latency due to traffic data waiting in the SPS scheduling can be reduced, the problem that the semi-persistent scheduling cannot meet the requirement of low latency in the related art can be solved, and scheduling flexibility is improved.

It should be noted that the step S302 may be performed separately or may be performed in combination with the step S304, but the present disclosure is not limited thereto.

It should be noted that the M transmission opportunities may be selected from the N transmission opportunities by the sending end. A value of M is at least one of: a constant, configured by a system, and determined by the sending end.

It should be noted that the M transmission opportunities may be used for transmitting different data, but the present disclosure is not limited thereto.

In the embodiment of the present disclosure, the semi-persistent scheduling information may further include indication information for indicating a transmission opportunity window. The N transmission opportunities are within the transmission opportunity window.

It should be noted that, the semi-persistent scheduling information may include one of: a starting position of the transmission opportunity window; the starting position of the transmission opportunity window and a length of the transmission opportunity window; the starting position of the transmission opportunity window, the length of the transmission opportunity window and a transmission opportunity interval; the starting position of the transmission opportunity window, the length of the transmission opportunity window and the number of transmission opportunities; the starting position of the transmission opportunity window, the transmission opportunity interval and the number of transmission opportunities; the starting position of the transmission opportunity window, a transmission opportunity starting position in the transmission opportunity window and the length of the transmission opportunity window; the starting position of the transmission opportunity window, the transmission opportunity starting position in the transmission opportunity window, the length of the transmission opportunity window and the transmission opportunity interval; the starting position of the transmission opportunity window, the transmission opportunity starting position in the transmission opportunity window, the length of the transmission opportunity window and the number of transmission opportunities; and the starting position of the transmission opportunity window, the transmission opportunity starting position in the transmission opportunity window, the transmission opportunity interval and the number of transmission opportunities. That is, the above information may be used for indicating the distribution of the transmission opportunities in a semi-persistent scheduling period.

It should be noted that the transmission opportunity interval described above may represent, but is not limited to, an interval of N transmission opportunities in a semi-persistent scheduling period.

It should be noted that in the case where the semi-persistent scheduling information includes the starting position of the transmission opportunity window, the N transmission opportunities may be indicated by the starting position of the transmission opportunity window and a fixed window length (greater than 1), but the indicating of the N transmission opportunities is not limited thereto. It should be noted that the fixed window length may be preset by the sending end and the receiving end through a protocol.

In the embodiment of the present disclosure, the semi-persistent scheduling information may include: bitmap indication of the transmission opportunities; or a starting position of a transmission opportunity window and the bitmap indication of the transmission opportunities.

In the embodiment of the present disclosure, the semi-persistent scheduling information includes one or more transmission opportunity starting positions, or includes one or more transmission opportunity starting positions for the N transmission opportunities and at least one of: a transmission opportunity interval; and the number of the transmission opportunities.

It should be noted that the semi-persistent scheduling information includes multiple transmission opportunity starting positions, and each of the multiple transmission opportunity starting positions is used for indicating one transmission opportunity or a set of consecutive transmission opportunities among the N transmission opportunities.

In the embodiment of the present disclosure, the N transmission opportunities may be configured in at least one of the following manners: N consecutive transmission opportunities; N non-consecutive transmission opportunities; N consecutive transmission opportunities in one transmission opportunity window; N transmission opportunities periodically distributed in one transmission opportunity window; and N non-consecutive transmission opportunities in one transmission opportunity window.

It should be noted that the arranging manner of the plurality of transmission opportunities may be indicated by the semi-persistent scheduling information.

It should be noted that the semi-persistent scheduling information may further include at least one of: adjustment information of a starting position of the N transmission opportunities, and adjustment information of a transmission opportunity window.

It should be noted that the semi-persistent scheduling information may further include semi-persistent scheduling activation information for indicating activation, deactivation, reactivation, or release of a part of or all of the N transmission opportunities.

In the embodiment of the present disclosure, (N−M) transmission opportunities, among the N transmission opportunities and other than the M transmission opportunities, include a transmission opportunity for sending a reference signal; or the (N−M) transmission opportunities do not include the transmission opportunity for sending the reference signal.

It should be noted that, in an embodiment, the (N−M) transmission opportunities include the transmission opportunity for sending the reference signal and the (N−M) transmission opportunities include a first transmission opportunity of the N transmission opportunities, the first transmission opportunity is used for sending the reference signal.

It should be noted that the semi-persistent scheduling information is received in one of the following: radio resource control (RRC) protocol signaling, downlink control information (DCI), and a media access control (MAC) message.

It should be noted that the above steps may, but may not necessarily, be executed by a terminal.

It should be noted that the transmission opportunity described above may also, but may not necessarily, be a transmission subframe.

From the description of the embodiment described above, it will be apparent to those skilled in the art that the method in the embodiment described above may be implemented by software plus a necessary general-purpose hardware platform, or may of course be implemented by hardware. However, in many cases, the former is a preferred implementation mode. Based on this understanding, the solution provided by the present disclosure substantially, or the part contributing to the related art, may be embodied in the form of a software product. The computer software product is stored in a storage medium (such as an ROM/RAM, a magnetic disk or an optical disk) and includes several instructions for enabling a terminal device (which may be a mobile phone, a computer, a server, a network device, or the like) to execute the method according to each embodiment of the present disclosure.

Embodiment 3

The present embodiment further provides an apparatus for sending information. The apparatus is used for implementing the above-mentioned embodiments and preferred embodiments. What has been described will not be repeated. As used below, the term "module" may be software, hardware or a combination thereof capable of implementing predetermined functions. The apparatus in the embodiments described below is preferably implemented by software, but implementation by hardware or by a combination of software and hardware is also possible and conceived.

Figure 4:
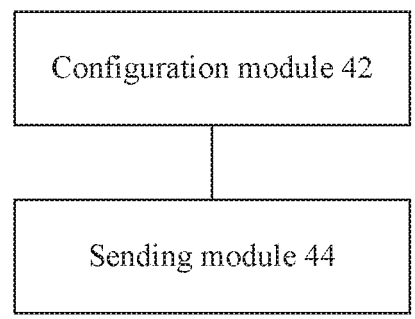
FIG. 4 is a structural block diagram of an apparatus for sending information according to an embodiment of the present disclosure.

FIG. 4 is a structural block diagram of the apparatus for sending information according to the embodiment of the present disclosure. As shown in FIG. 4, the apparatus includes: a configuration module 42 and a sending module 44.

The configuration module 42 is configured to configure semi-persistent scheduling information for indicating N transmission opportunities in a semi-persistent scheduling period. The N transmission opportunities include M transmission opportunities for transmitting data by a sending end. N is an integer greater than 1, M is an integer, and 0<M≤N.

The sending module 44 is connected to the configuration module 42, and is configured to send the configured semi-persistent scheduling information to a terminal.

With the apparatus described above, the sending module 44 sends the semi-persistent scheduling information, configured by the configuration module 42, for indicating N transmission opportunities in a semi-persistent scheduling period to the terminal, so that the terminal can flexibly use the M transmission opportunities to send data or detect whether corresponding downlink traffic exists. Compared with the existing art in which an SPS scheduling period includes one transmission opportunity, the method provided herein can directly select the next transmission opportunity, without waiting for a transmission opportunity in the next SPS scheduling period, to send data or detect whether corresponding downlink traffic exists when time dithering or offset (drift) occurs on the traffic data arrival. Thus the latency due to traffic data waiting in the SPS scheduling can be reduced, the problem that the semi-persistent scheduling cannot meet the requirement of low latency in the existing art can be solved, and scheduling flexibility is improved.

It should be noted that the sending end described above may be, but is not limited to, a base station or a terminal.

It should be noted that the M transmission opportunities may be selected from the N transmission opportunities by the sending end. A value of M is at least one of: a constant, configured by a system, and determined by the sending end.

It should be noted that the N transmission opportunities may include: transmission opportunities used for the terminal to transmit data and transmission opportunities not used for the terminal to transmit data. For example, if one semi-persistent scheduling period includes three transmission opportunities, one of the three transmission opportunities is used for the terminal to transmit data, and the other two transmission opportunities are not used for the terminal to transmit data; or two of the three transmission opportunities are used for the terminal to transmit data, and the remaining one transmission opportunity is not used for transmitting data, but the present disclosure is not limited thereto.

It should be noted that the M transmission opportunities are used for transmitting different data. For example, one semi-persistent scheduling period includes three transmission opportunities, and two of the three transmission opportunities are used for the terminal to transmit data, while the two transmission opportunities are used for transmitting different data, but the present disclosure is not limited thereto.

It should be noted that if the N transmission opportunities include the redundant transmission opportunity, the M transmission opportunities may transmit different redundancy versions of the same data.

In the embodiment of the present disclosure, the semi-persistent scheduling information may further include indication information for indicating a transmission opportunity window. The N transmission opportunities are within the transmission opportunity window.

It should be noted that, the semi-persistent scheduling information may include one of: a starting position of the transmission opportunity window; the starting position of the transmission opportunity window and a length of the transmission opportunity window; the starting position of the transmission opportunity window, the length of the transmission opportunity window and a transmission opportunity interval; the starting position of the transmission opportunity window, the length of the transmission opportunity window and the number of transmission opportunities; the starting position of the transmission opportunity window, the transmission opportunity interval and the number of transmission opportunities; the starting position of the transmission opportunity window, a transmission opportunity starting position in the transmission opportunity window and the length of the transmission opportunity window; the starting position of the transmission opportunity window, the transmission opportunity starting position in the transmission opportunity window, the length of the transmission opportunity window and the transmission opportunity interval; the starting position of the transmission opportunity window, the transmission opportunity starting position in the transmission opportunity window, the length of the transmission opportunity window and the number of transmission opportunities; and the starting position of the transmission opportunity window, the transmission opportunity starting position in the transmission opportunity window, the transmission opportunity interval and the number of transmission opportunities. That is, the above information may be used to indicate the distribution of the transmission opportunities in a semi-persistent scheduling period.

It should be noted that the transmission opportunity interval described above may represent, but is not limited to, an interval of N transmission opportunities in a semi-persistent scheduling period.

It should be noted that in the case where the semi-persistent scheduling information includes the starting position of the transmission opportunity window, the N transmission opportunities may be indicated by the starting position of the transmission opportunity window and a fixed window length (greater than 1), but the indicating of the N transmission opportunities is not limited thereto. It should be noted that the fixed window length may be preset by the sending end and the receiving end through a protocol.

In the embodiment of the present disclosure, the semi-persistent scheduling information may include: a transmission opportunity indication bitmap, or include a starting position of a transmission opportunity window and the transmission opportunity indication bitmap.

In the embodiment of the present disclosure, the semi-persistent scheduling information includes one or more transmission opportunity starting positions, or includes one or more transmission opportunity starting positions for the N transmission opportunities and at least one of: a transmission opportunity interval; and the number of the transmission opportunities.

It should be noted that when the semi-persistent scheduling information includes multiple transmission opportunity starting positions, and each of the multiple transmission opportunity starting positions is used for indicating one transmission opportunity or a set of consecutive transmission opportunities among the N transmission opportunities.

In the embodiment of the present disclosure, the N transmission opportunities may be arranged in at least one of the following manners: N consecutive transmission opportunities; N non-consecutive transmission opportunities; N consecutive transmission opportunities in one transmission opportunity window; N transmission opportunities periodically distributed in one transmission opportunity window; and N non-consecutive transmission opportunities in one transmission opportunity window.

It should be noted that the arranging manner of the N transmission opportunities may be indicated by the semi-persistent scheduling information.

It should be noted that the semi-persistent scheduling information may further include at least one of: adjustment information of a starting position of the N transmission opportunities, and adjustment information of a transmission opportunity window.

It should be noted that the semi-persistent scheduling information may further include semi-persistent scheduling activation information for indicating activation, deactivation, reactivation, or release of a part of or all of the N transmission opportunities.

In the embodiment of the present disclosure, (N–M) transmission opportunities, among the N transmission opportunities and other than the M transmission opportunities, include a transmission opportunity for sending a reference signal; or the (N–M) transmission opportunities do not include the transmission opportunity for sending the reference signal.

It should be noted that, in determining that the (N–M) transmission opportunities include the transmission opportunity for sending the reference signal and the (N–M) transmission opportunities include a first transmission opportunity of the N transmission opportunities, the first transmission opportunity is used for sending the reference signal.

In the embodiment of the present disclosure, the sending module 44 may further be configured to send the semi-persistent scheduling information to the terminal in one of the following: radio resource control (RRC) protocol signaling, downlink control information (DCI), and a media access control (MAC) message.

In the embodiment of the present disclosure, the configuration module 42 may further be configured to configure the semi-persistent scheduling information according to the terminal traffic type or the network side traffic type.

In the embodiment of the present disclosure, the apparatus may further include: an obtaining module, which is connected to the configuration module 42 and configured to obtain the terminal traffic type from the terminal or obtain the network side traffic type by parsing a QoS Class Identifier (QCI) in a bearer setup request message.

It should be noted that the above-mentioned apparatus for sending the semi-persistent scheduling information may, but is not limited to, be in a network side device, such as a base station. It should be noted that the transmission opportunity described above may also, but may not necessarily, be a transmission subframe or a TTI.

It should be noted that the various modules described above may be implemented by software or hardware. Implementation by hardware may, but may not necessarily, be performed in the following manner: the various modules described above are located in a same processor, or the various modules described above are located in their respective processors in any combination form.

Embodiment 4

Figure 5:
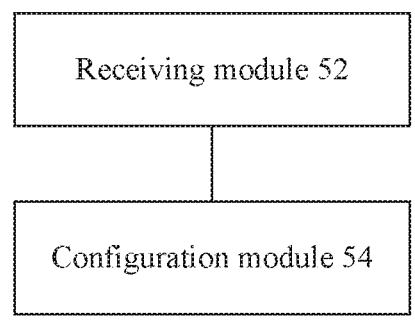
FIG. 5 is a structural block diagram of an apparatus for receiving information according to an embodiment of the present disclosure.

The present embodiment provides an apparatus for receiving information. FIG. 5 is a structural block diagram of the apparatus for receiving information according to the embodiment of the present disclosure. As shown in FIG. 5, the apparatus includes: a receiving module 52 and a configuration module 54.

The receiving module 52 is configured to receive semi-persistent scheduling information for indicating N transmission opportunities in a semi-persistent scheduling period sent by a network side. The N transmission opportunities include M transmission opportunities for transmitting data by a sending end. N is an integer greater than 1, M is an integer, and $0 < M \leq N$.

The configuration module 54 is connected to the receiving module 52, and is configured to perform corresponding configuration according to the received semi-persistent scheduling information.

With the apparatus described above, the receiving module 52 receives the semi-persistent scheduling information for indicating N transmission opportunities in a semi-persistent scheduling period sent by a network side, and the N transmission opportunities include the M transmission opportunities for transmitting data by a sending end, so that the terminal can flexibly use the M transmission opportunities to send data or detect whether corresponding downlink traffic exists. Compared with the existing art in which an SPS scheduling period includes one transmission opportunity, the method provided herein can directly select the next transmission opportunity, without waiting for a transmission opportunity in the next SPS scheduling period, to send data or detect whether corresponding downlink traffic exists when time dithering or offset (drift) occurs on the traffic data arrival. Thus the latency due to traffic data waiting in the SPS scheduling can be reduced, the problem that the semi-persistent scheduling cannot meet the requirement of low latency in the related art can be solved, and scheduling flexibility is improved.

It should be noted that the M transmission opportunities may be selected from the N transmission opportunities by the sending end. A value of M is at least one of: a constant, configured by a system, and determined by the sending end.

It should be noted that the M transmission opportunities may be used for transmitting different data, but the present disclosure is not limited thereto.

In the embodiment of the present disclosure, the semi-persistent scheduling information may further include indication information for indicating a transmission opportunity window. The N transmission opportunities are within the transmission opportunity window.

It should be noted that, the semi-persistent scheduling information may include one of: a starting position of the transmission opportunity window; the starting position of the transmission opportunity window and a length of the transmission opportunity window; the starting position of the transmission opportunity window, the length of the transmission opportunity window and a transmission opportunity interval; the starting position of the transmission opportunity window, the length of the transmission opportunity window and the number of transmission opportunities; the starting position of the transmission opportunity window, the transmission opportunity interval and the number of transmission opportunities; the starting position of the transmission opportunity window, a transmission opportunity starting position in the transmission opportunity window and the length of the transmission opportunity window; the starting position of the transmission opportunity window, the transmission opportunity starting position in the transmission opportunity window, the length of the transmission opportunity window and the transmission opportunity interval; the starting position of the transmission opportunity window, the transmission opportunity starting position in the transmission opportunity window, the length of the transmission opportunity window and the number of transmission opportunities; and the starting position of the transmission opportunity window, the transmission opportunity starting position in the transmission opportunity window, the transmission opportunity interval and the number of transmission opportunities. That is, the above information may be used for indicating the distribution of the transmission opportunities in a semi-persistent scheduling period.

It should be noted that the transmission opportunity interval described above may represent, but is not limited to, an interval of N transmission opportunities in a semi-persistent scheduling period.

It should be noted that in the case where the semi-persistent scheduling information includes the starting position of the transmission opportunity window, the N transmission opportunities may be indicated by the starting position of the transmission opportunity window and a fixed window length (greater than 1), but the indicating of the N transmission opportunities is not limited thereto. It should be noted that the fixed window length may be preset by the sending end and the receiving end through a protocol.

In the embodiment of the present disclosure, the semi-persistent scheduling information may include: a transmission opportunity indication bitmap; or include: a starting position of a transmission opportunity window and the transmission opportunity indication bitmap.

In the embodiment of the present disclosure, the semi-persistent scheduling information includes one or more transmission opportunity starting positions, or includes one or more transmission opportunity starting positions for the N transmission opportunities and at least one of: a transmission opportunity interval; and the number of the transmission opportunities.

It should be noted that the semi-persistent scheduling information includes multiple transmission opportunity starting positions, and each of the multiple transmission opportunity starting positions is used for indicating one transmission opportunity or a set of consecutive transmission opportunities among the N transmission opportunities.

In the embodiment of the present disclosure, the N transmission opportunities may be arranged in at least one of the following manners: N consecutive transmission opportunities; N non-consecutive transmission opportunities; N consecutive transmission opportunities in one transmission opportunity window; N transmission opportunities periodically distributed in one transmission opportunity window; and N non-consecutive transmission opportunities in one transmission opportunity window.

It should be noted that the arranging manner of the transmission opportunities may be indicated by the semi-persistent scheduling information.

It should be noted that the semi-persistent scheduling information may further include at least one of: adjustment information of a starting position of the N transmission opportunities, and adjustment information of a transmission opportunity window.

It should be noted that the semi-persistent scheduling information may further include semi-persistent scheduling activation information for indicating activation, deactivation, reactivation, or release of a part of or all of the N transmission opportunities.

In the embodiment of the present disclosure, (N−M) transmission opportunities, among the N transmission opportunities and other than the M transmission opportunities, include a transmission opportunity for sending a reference signal; or the (N−M) transmission opportunities do not include the transmission opportunity for sending the reference signal.

It should be noted that, in determining that the (N−M) transmission opportunities include the transmission opportunity for sending the reference signal and the (N−M) transmission opportunities include a first transmission opportunity of the N transmission opportunities, the first transmission opportunity is used for sending the reference signal.

It should be noted that the receiving module 52 may further receive the semi-persistent scheduling information in one of the following: radio resource control (RRC) protocol signaling, downlink control information (DCI), and a media access control (MAC) message.

It should be noted that the apparatus in the embodiment may, but may not necessarily, be located in a terminal.

It should be noted that the transmission opportunity described above may also, but may not necessarily, be a transmission subframe.

It should be noted that the various modules described above may be implemented by software or hardware. Implementation by hardware may, but may not necessarily, be performed in the following manner: the various modules described above are located in a same processor, or the various modules described above are located in their respective processors in any combination form.

Embodiment 5

Figure 6:
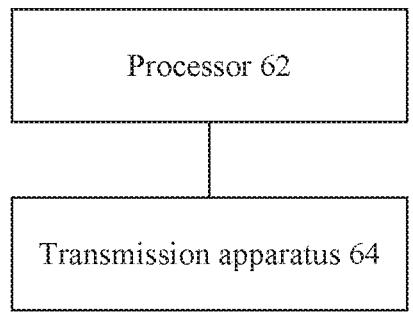
FIG. 6 is a structural block diagram of a base station according to an embodiment of the present disclosure.

The embodiment of the present disclosure further provides a base station. FIG. 6 is a structural block diagram of the base station according to the embodiment of the present disclosure. As shown in FIG. 6, the base station may include: a processor 62 and a transmission apparatus 64.

The processor 62 is configured to configure semi-persistent scheduling information for indicating N transmission opportunities in a semi-persistent scheduling period. The N transmission opportunities include M transmission opportunities for transmitting data by a sending end. N is an integer greater than 1, M is an integer, and 0<M≤N.

The transmission apparatus 64 is connected to the processor 62 and is configured to send the configured semi-persistent scheduling information to a terminal.

With the base station described above, the transmission apparatus 64 sends the semi-persistent scheduling information, configured by the processor 62, for indicating N transmission opportunities in a semi-persistent scheduling period to the terminal. Compared with the existing art in which an SPS scheduling period includes one transmission opportunity, the method provided herein can directly and flexibly use the M transmission opportunities in the present SPS scheduling period, without waiting for a transmission opportunity in the next SPS scheduling period, to send data or detect whether corresponding downlink traffic exists when time dithering or offset (drift) occurs on the traffic data arrival. Thus the latency due to traffic data waiting in the SPS scheduling can be reduced, the problem that the semi-persistent scheduling cannot meet the requirement of low latency in the related art can be solved, and scheduling flexibility is improved.

It should be noted that the sending end described above may be, but is not limited to, a base station or a terminal.

It should be noted that the M transmission opportunities may be selected from the N transmission opportunities by the sending end. A value of M is at least one of: a constant, configured by a system, and determined by the sending end.

It should be noted that the N transmission opportunities may include: a redundant transmission opportunity. The redundant transmission opportunity may be the remaining transmission opportunities among the N transmission opportunities other than the M transmission opportunities. That is, the N transmission opportunities may include transmission opportunities not used for transmitting data. For example, if one semi-persistent scheduling period includes three transmission opportunities, one of the three transmission opportunities is used for the terminal to transmit data, and the other two transmission opportunities are not used for the terminal to transmit data; or two of the three transmission opportunities are used for the terminal to transmit data, and the remaining one transmission opportunity is not used for transmitting data, but the present disclosure is not limited thereto.

It should be noted that the M transmission opportunities may be used for transmitting different data. For example, one semi-persistent scheduling period includes three transmission opportunities, and two of the three transmission opportunities are used for the terminal to transmit data, while the two transmission opportunities are used for transmitting different data, but the present disclosure is not limited thereto.

It should be noted that if the N transmission opportunities include the redundant transmission opportunity, the M transmission opportunities may transmit different redundancy versions of the same data.

In the embodiment of the present disclosure, the semi-persistent scheduling information may further include indication information for indicating a transmission opportunity window. The N transmission opportunities are within the transmission opportunity window.

It should be noted that, the semi-persistent scheduling information may include one of: a starting position of the transmission opportunity window; the starting position of the transmission opportunity window and a length of the transmission opportunity window; the starting position of the transmission opportunity window, the length of the transmission opportunity window and a transmission opportunity interval; the starting position of the transmission opportunity window, the length of the transmission opportunity window and the number of transmission opportunities; the starting position of the transmission opportunity window, the transmission opportunity interval and the number of transmission opportunities; the starting position of the transmission opportunity window, a transmission opportunity starting position in the transmission opportunity window and the length of the transmission opportunity window; the starting position of the transmission opportunity window, the transmission opportunity starting position in the transmission opportunity window, the length of the transmission opportunity window and the transmission opportunity interval; the starting position of the transmission opportunity window, the transmission opportunity starting position in the transmission opportunity window, the length of the transmission opportunity window and the number of transmission opportunities; and the starting position of the transmission opportunity window, the transmission opportunity starting position in the transmission opportunity window, the transmission opportunity interval and the number of transmission opportunities. That is, the above information may be used for indicating the distribution of the transmission opportunities in a semi-persistent scheduling period.

It should be noted that the transmission opportunity interval described above may represent an interval of N transmission opportunities in a semi-persistent scheduling period, but the present disclosure is not limited to this.

It should be noted that in the case where the semi-persistent scheduling information includes the starting position of the transmission opportunity window, the N transmission opportunities may be indicated by the starting position of the transmission opportunity window and a fixed window length (greater than 1), but the indicating of the N transmission opportunities is not limited thereto. It should be noted that the fixed window length may be preset by the sending end and the receiving end through a protocol.

In the embodiment of the present disclosure, the semi-persistent scheduling information may include: a transmission opportunity indication bitmap, or include: a starting position of a transmission opportunity window and the transmission opportunity indication bitmap.

In the embodiment of the present disclosure, the semi-persistent scheduling information includes one or more transmission opportunity starting positions, or includes one or more transmission opportunity starting positions for the N transmission opportunities and at least one of: a transmission opportunity interval and the number of the transmission opportunities.

It should be noted that when the semi-persistent scheduling information includes multiple transmission opportunity starting positions, and each of the multiple transmission opportunity starting positions is used for indicating one transmission opportunity or a set of consecutive transmission opportunities among the N transmission opportunities.

In the embodiment of the present disclosure, the N transmission opportunities may be represented in at least one of the following manners: N consecutive transmission opportunities;

N non-consecutive transmission opportunities; N consecutive transmission opportunities in one transmission opportunity window; N transmission opportunities periodically distributed in one transmission opportunity window; and N non-consecutive transmission opportunities in one transmission opportunity window.

It should be noted that the representation form of the transmission opportunities may be indicated by the semi-persistent scheduling information.

It should be noted that the semi-persistent scheduling information may further include at least one of: adjustment information of a starting position of the N transmission opportunities, and adjustment information of a transmission opportunity window.

It should be noted that the semi-persistent scheduling information may further include semi-persistent scheduling activation information for indicating activation, deactivation, reactivation, or release of a part of or all of the N transmission opportunities.

In the embodiment of the present disclosure, (N–M) transmission opportunities, among the N transmission opportunities and other than the M transmission opportunities, include a transmission opportunity for sending a reference signal; or the (N–M) transmission opportunities do not include the transmission opportunity for sending the reference signal.

It should be noted that, in determining that the (N–M) transmission opportunities include the transmission opportunity for sending the reference signal and the (N–M) transmission opportunities include a first transmission opportunity of the N transmission opportunities, the first transmission opportunity is used for sending the reference signal.

In the embodiment of the present disclosure, the transmission apparatus 64 may further be configured to send the semi-persistent scheduling information to the terminal in one of the following manners: radio resource control (RRC) protocol signaling, downlink control information (DCI), and a media access control (MAC) message.

In the embodiment of the present disclosure, the processor 62 may further be configured to configure the semi-persistent scheduling information according to the terminal traffic type or the network side traffic type.

It should be noted that the processor 62 may further be configured to obtain the terminal traffic type from the terminal or obtain the network side traffic type by parsing a QoS Class Identifier (QCI) in a bearer setup request message.

It should be noted that the transmission apparatus 64 may be, but is not limited to, a radio frequency module. It should be noted that the transmission opportunity described above may also, but may not necessarily, be a transmission subframe.

Figure 7:
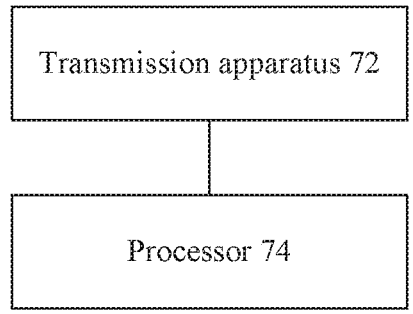
FIG. 7 is a structural block diagram of a terminal according to an embodiment of the present disclosure.

The embodiment of the present disclosure further provides a terminal. FIG. 7 is a structural block diagram of the terminal according to the embodiment of the present disclosure. As shown in FIG. 7, the terminal includes: a transmission apparatus 72 and a processor 74.

The transmission apparatus 72 is configured to receive semi-persistent scheduling information for indicating N transmission opportunities in a semi-persistent scheduling period sent by a network side. The N transmission opportunities include M transmission opportunities for transmitting data by a sending end. N is an integer greater than 1, M is an integer, and 0<M≤N.

The processor 74 is connected to the transmission apparatus 72, and is configured to perform corresponding configuration according to the received semi-persistent scheduling information.

With the terminal described above, the transmission apparatus 72 receives the semi-persistent scheduling information for indicating N transmission opportunities in a semi-persistent scheduling period sent by a network side, and the N transmission opportunities include the M transmission opportunities for transmitting data by a sending end, so that the terminal can flexibly use the M transmission opportunities to send data or detect whether corresponding downlink traffic exists. Compared with the existing art in which an SPS scheduling period includes one transmission opportunity, the method provided herein can directly select the next transmission opportunity, without waiting for a transmission opportunity in the next SPS scheduling period, to send data or detect whether corresponding downlink traffic exists when time dithering or offset (drift) occurs on the traffic data arrival. Thus the latency due to traffic data waiting in the SPS scheduling can be reduced, the problem that the semi-persistent scheduling cannot meet the requirement of low latency in the related art can be solved, and scheduling flexibility is improved.

It should be noted that the M transmission opportunities may be selected from the N transmission opportunities by the sending end. A value of M is at least one of: a constant, configured by a system, and determined by the sending end.

It should be noted that the M transmission opportunities may be used for transmitting different data, but the present disclosure is not limited thereto.

In the embodiment of the present disclosure, the semi-persistent scheduling information may further include indication information for indicating a transmission opportunity window. The transmission opportunity window includes the transmission opportunities.

It should be noted that, the semi-persistent scheduling information may include one of: a starting position of the transmission opportunity window; the starting position of the transmission opportunity window and a length of the transmission opportunity window; the starting position of the transmission opportunity window, the length of the transmission opportunity window and a transmission opportunity interval; the starting position of the transmission opportunity window, the length of the transmission opportunity window and the number of transmission opportunities; the starting position of the transmission opportunity window, the transmission opportunity interval and the number of transmission opportunities; the starting position of the transmission opportunity window, a transmission opportunity starting position in the transmission opportunity window and the length of the transmission opportunity window; the starting position of the transmission opportunity window, the transmission opportunity starting position in the transmission opportunity window, the length of the transmission opportunity window and the transmission opportunity interval; the starting position of the transmission opportunity window, the transmission opportunity starting position in the transmission opportunity window, the length of the transmission opportunity window and the number of transmission opportunities; and the starting position of the transmission opportunity window, the transmission opportunity starting position in the transmission opportunity window, the transmission opportunity interval and the number of transmission opportunities. That is, the above information may be used for indicating the distribution of transmission opportunities in a semi-persistent scheduling period.

It should be noted that the transmission opportunity interval described above may indicate an interval of the plurality of transmission opportunities in a semi-persistent scheduling period, but the present disclosure is not limited to this.

It should be noted that in the case where the semi-persistent scheduling information includes the starting position of the transmission opportunity window, the transmission opportunities may be indicated by the starting position of the transmission opportunity window and a fixed window length (greater than 1), but the indicating of the transmission opportunities is not limited thereto. It should be noted that the fixed window length may be preset by the sending end and the receiving end through a protocol.

In the embodiment of the present disclosure, the semi-persistent scheduling information may include: a transmission opportunity indication bitmap, or include: a starting position of a transmission opportunity window and the transmission opportunity indication bitmap.

In the embodiment of the present disclosure, the semi-persistent scheduling information includes one or more transmission opportunity starting positions, or includes one or more transmission opportunity starting positions for the N transmission opportunities and at least one of: a transmission opportunity interval and the number of the transmission opportunities.

It should be noted that the semi-persistent scheduling information includes multiple transmission opportunity starting positions, and each of the multiple transmission opportunity starting positions is used for indicating one transmission opportunity or a set of consecutive transmission opportunities among the N transmission opportunities.

In the embodiment of the present disclosure, the N transmission opportunities may be in at least one of the following manners: N consecutive transmission opportunities; N non-consecutive transmission opportunities; N consecutive transmission opportunities in one transmission opportunity window; N transmission opportunities periodically distributed in one transmission opportunity window; and N non-consecutive transmission opportunities in one transmission opportunity window.

It should be noted that the configuration form of the N transmission opportunities may be indicated by the semi-persistent scheduling information.

It should be noted that the semi-persistent scheduling information may further include at least one of: adjustment information of a starting position of the N transmission opportunities, and adjustment information of a transmission opportunity window.

It should be noted that the semi-persistent scheduling information may further include semi-persistent scheduling activation information for indicating activation, deactivation, reactivation, or release of a part of or all of the N transmission opportunities.

In the embodiment of the present disclosure, (N–M) transmission opportunities, among the N transmission opportunities and other than the M transmission opportunities, include a transmission opportunity for sending a reference signal; or the (N–M) transmission opportunities do not include the transmission opportunity for sending the reference signal.

It should be noted that, in determining that the (N–M) transmission opportunities include a transmission opportunity for sending the reference signal and the (N–M) transmission opportunities include a first transmission opportunity of the N transmission opportunities, the first transmission opportunity is used for sending the reference signal.

It should be noted that the transmission apparatus 72 may further be configured to receive the semi-persistent scheduling information in one of the following manners: radio resource control (RRC) protocol signaling, downlink control information (DCI), and a media access control (MAC) message.

It should be noted that the transmission opportunity described above may also, but may not necessarily, be a transmission subframe or a TTI.

Embodiment 6

The embodiment of the present disclosure further provides a storage medium. Optionally, in the embodiment, the storage medium may further be configured to store program codes for executing the steps in the method in the embodiment 1 or the embodiment 2.

Optionally, in the embodiment, the storage medium described above may be, but is not limited to, a USB flash drive, a read-only memory (ROM), a random access memory (RAM), a mobile hard disk, a magnetic disk, an optical disk or another medium capable of storing the program codes.

Optionally, in the embodiment, a processor executes the steps in the method in the embodiment 1 or the embodiment 2 according to the program codes stored in the storage medium.

Optionally, for specific examples in the embodiment, reference may be made to the examples described in the above-mentioned embodiments and optional embodiments, and repetition will not be made herein.

To better understand the embodiments of the present disclosure, the present disclosure will be further described below in conjunction with preferred embodiments.

Figure 8:
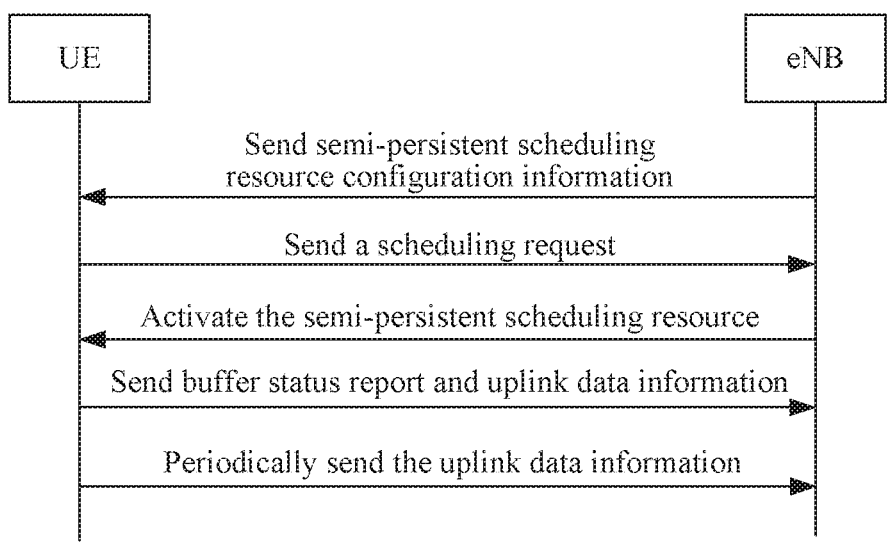
FIG. 8 is a schematic diagram of uplink SPS scheduling according to a preferred embodiment of the present disclosure.

A preferred embodiment of the present disclosure provides a method for processing periodic time domain resource structure configuration and activation, and aims to solve the problem of large latency in the existing semi-persistent scheduling (SPS) scheme. In order to achieve purposes of the present disclosure, the present disclosure provides the method for processing the periodic time domain resource structure configuration and activation, so as to configure different SPS periods and resource sizes for the terminal/network side according to the traffic type of the terminal/network side. In the period, a plurality of transmission opportunities are configured for the terminal. The plurality of transmission opportunities may be consecutive or may be non-consecutive. The terminal or the network side only sends corresponding data in the configured transmission opportunities. FIG. 8 is a schematic diagram of uplink SPS scheduling according to the preferred embodiment of the present disclosure. In conjunction with the FIG. 8, the method may include the steps described below.

Different SPS periods and resource sizes are configured for the terminal/network side according to the traffic type of the terminal/network side. In the period, a plurality of transmission opportunities are configured for the terminal. The traffic type may be obtained by parsing a QoS Class Identifier (QCI) in a bearer setup request message. Optionally, the plurality of transmission opportunities are consecutive in the method. Alternatively, the plurality of transmission opportunities are non-consecutive in the method. Alternatively, the plurality of transmission opportunities include consecutive opportunities and non-consecutive opportunities. Alternatively, the plurality of transmission opportunities are configured through a message which may be RRC, DCI, a MAC message or the like. Alternatively, the plurality of transmission opportunities are transmitted in a window in the method. Alternatively, one or more transmission opportunities are activated in the method. Alternatively, in the method, the network side may record which transmission opportunities are subsequently used by a user equipment (UE), and release the transmission opportunities not used by the UE.

The network side activates the corresponding SPS configuration for the terminal according to a scheduling request from the terminal. The terminal may select one or more transmission opportunities from multiple configured transmission opportunities to send corresponding data information.

For traffic with multi-user, low latency, and small data amount, the overhead of the control channels is a key factor that limits the system capacity. Therefore, a semi-persistent scheduling mode may be used to increase system capacity. In the traditional semi-persistent scheduling mode, large transmission latency is also introduced and the scheduling is not flexible enough when an offset exists between the traffic data arrival and the current activated subframe. This disclosure is used for reducing the SPS scheduling latency and adjusting the flexibility of user scheduling. The preferred embodiment of the present disclosure may also solve the offset and drift problems that occur in SPS scheduling.

The preferred embodiment of the present disclosure provides the method for processing periodic time domain resource structure configuration and activation, and aims to solve the problem of large latency in the existing semi-persistent scheduling (SPS) scheme. In order to achieve a purpose of the preferred embodiment of the present disclosure, the preferred embodiment of the present disclosure provides a method for processing the periodic time domain resource structure configuration and activation, so as to configure different SPS periods and resource sizes for the terminal according to the traffic type of the terminal/network side. In the period, a plurality of transmission opportunities are configured for the terminal. The plurality of transmission opportunities may be consecutive or may be non-consecutive. The terminal only sends corresponding data in the configured transmission opportunities.

In the preferred embodiment, the terminal determines the required SPS resource size, period, and the like according to information such as the type and size of the message. For the uplink semi-persistent scheduling, the terminal reports the required SPS resource size, period, and the like to a base station. The base station may obtain information required for downlink SPS scheduling from the network side, that is, the SPS resource size and period required for the downlink traffic may be obtained by parsing a QoS Class Identifier (QCI) in a bearer setup request message by the network side.

The base station uses radio resource control (RRC) signaling to indicate the SPS resource configuration information to the terminal according to the obtained information.

The SPS resource configuration information includes an SPS period, resource configuration (including a resource size and a resource starting position, etc.) for SPS scheduling in the SPS period, a modulation and coding scheme (MCS) during transmission, and a plurality of consecutive transmission or receiving opportunities configured for the terminal in the SPS period.

Preferred Embodiment 1

In step 1: a network side configures SPS resource information.

Different SPS periods and frequency domain resources are configured for a terminal according to information reported by the terminal. A plurality of transmission opportunities in the SPS period are configured for the terminal. Specifically, a corresponding SPS period is configured for the terminal according to the information reported by the terminal. A base station configures a plurality of transmission opportunities in the period for the terminal. The plurality of transmission opportunities in the period are in one window. Distribution of the transmission opportunities is indicated by a starting position of the window sent by the base station. The number of transmission opportunities in the window is specified through a protocol. Alternatively, the distribution of transmission opportunities may be indicated by the starting position of the window and a length of the window, which are sent by the base station.

In the embodiment, radio resource control (RRC) protocol signaling is used to indicate SPS scheduling configuration information to the terminal. Specifically, the scheduling configuration information is configured in the SPS-config cell of the RRC signaling. The scheduling configuration information may include the SPS scheduling period which includes N TTIs (for example, 100 TTIs), resources (including the resource size and resource starting position, etc.) of the SPS scheduling in the period, and the MCS for transmission.

Figure 9:
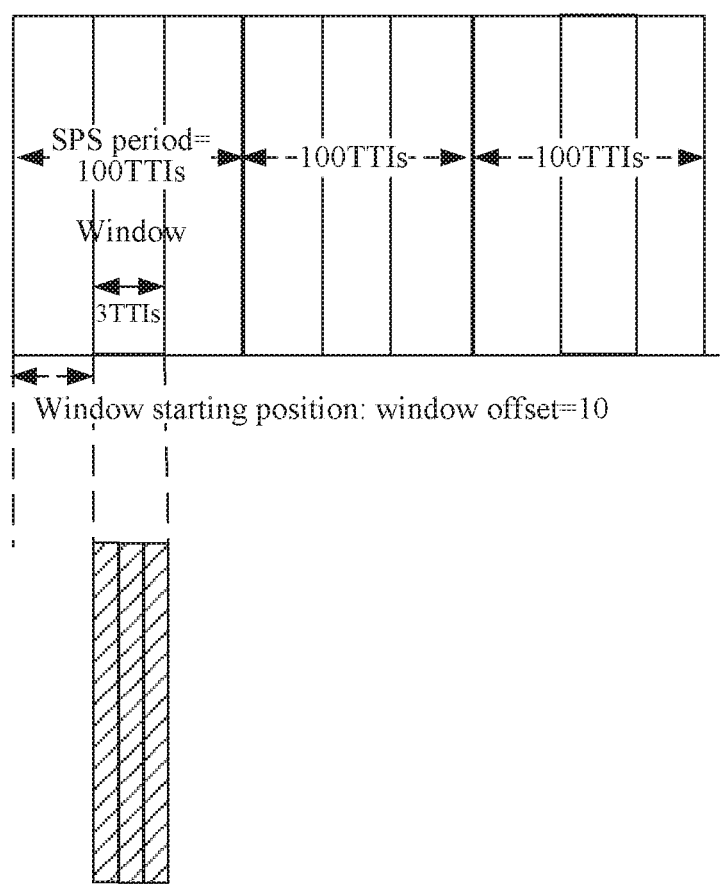
FIG. 9 is a schematic diagram of resource configuration according to a preferred embodiment 1 of the present disclosure.

The base station may deliver multiple different configurations to indicate the same distribution of transmission opportunities, only one of the configurations for indicating the distribution of the transmission opportunities is selected in the present embodiment for description, and other configurations are not described in the embodiment. For example, the base station delivers a window starting position (offset) to indicate the distribution of the transmission opportunities, and the number of transmission opportunities in the window is specified through the protocol. The window starting position (offset) is delivered by the base station (offset=10 in the embodiment, that is, the window starting position is located in the 11th TTI of the period (offset=0 indicates that the window starting position is located in the first TTI of the period)). If the protocol specifies that only three transmission opportunities exist in a scheduling period, that is, a length of the window is three TTIs. the window includes three consecutive transmission opportunities. Referring specifically to FIG. 9, FIG. 9 is a schematic diagram of resource configuration according to the preferred embodiment 1 of the present disclosure.

In step 2: the terminal receives the semi-persistent scheduling configuration information delivered by the network side, and performs corresponding configuration.

In step 3: traffic data arrives the terminal, and then the terminal determines whether the SPS resource is activated. If the SPS resource is activated, a step 6 is performed; otherwise, a step 4 is performed.

In step 4: the terminal sends a scheduling request to request the network side to activate the SPS resource.

In step 5: the network side delivers SPS activation signaling.

The network side sends SPS activation/reconfiguration signaling to the terminal (UE) on a physical downlink control channel (PDCCH) according to the scheduling request (SR) reported by the terminal. The terminal obtains a PDCCH scrambled by a SPS cell radio network temporary identifier (C-RNTI), and activates configured transmission opportunities. It should be noted that the activation signaling is valid from the current activation subframe until the terminal receives and executes deactivation signaling. In response to determining that the terminal receives and executes deactivation signaling, the activation signaling lapses.

In step 6: the terminal selects one or more transmission opportunities from the activated transmission opportunities to send corresponding data.

Specifically, in each period, the network side configures and activates a plurality of transmission opportunities for the terminal, and the terminal selects one or more transmission opportunities. In the period, if the transmission opportunities selected by the terminal is less than the configured transmission opportunities, the terminal may do processing as described below.

The terminal does not send any information in the unselected transmission opportunity (that is, none of a reference signal, a physical uplink shared channel (PUSCH), or the like is sent).

Alternatively, the unselected transmission opportunity only includes the first transmission opportunity among the configured transmission opportunities, and the terminal sends only the pilot (reference signal) in the transmission opportunity.

Alternatively, the unselected transmission opportunities include the first transmission opportunity and a non-first transmission opportunity among the configured transmission opportunities. The terminal sends the pilot (reference signal) in the first transmission opportunity, and does not send any information in the non-first transmission opportunity (that is, no reference signal or the PUSCH channel is sent).

For example, in the embodiment, the terminal selects the first two transmission opportunities of the three transmission opportunities to send data information (that is, the PUSCH channel), and the terminal does not send any information (including the reference signal, the PUSCH channel, and the like) in the last transmission opportunity.

In step 7: the network side detects the data information sent by the terminal on the corresponding transmission opportunities according to the configuration information.

Specifically, the network side locates the corresponding transmission opportunities in the SPS scheduling period according to the configuration, and detects whether there is data information sent by the terminal in the transmission opportunities in the period. It should be noted that, in the first transmission opportunity in the period, the network side needs to determine whether there is the reference signal or data information sent by the terminal, while in other transmission opportunities in the period, the network side only needs to determine whether there is data information sent by the terminal.

For example, the network side locates three transmission opportunities in the SPS scheduling period according to the configured window starting position and the number of transmissions specified by the protocol, and the network side detects whether this is information on the three transmission opportunities. The data information sent by the terminal is detected on the first two transmission opportunities by the network side, and no information is detected on the third transmission opportunity by the network side.

In step 8: the network side deactivates corresponding SPS resource configuration.

Specifically, if no data information is to be sent in any transmission opportunity in the current period, the terminal sends a null data packet or does not send any data on the SPS resource. Upon determining that the network side continuously receives the null packets in the configured SPS subframes or that the network side continuously fails to detect the data information sent by the terminal in the configured SPS subframes multiple times, the network side may deactivate the SPS resource.

In the above process, if the base station fails to detect a first-transmitted data packet (which may be a traffic data packet or a null data packet), the base station delivers a non-acknowledge (NACK) for the first-transmitted data packet, and the terminal retransmits the packet upon receiving the NACK. This solution adopts a synchronous feedback mode. Considering that the traffic has a relatively high requirement for latency, a multi-stream processing scheme is adopted. Different transmission data streams are used for the first transmission and the retransmission, which can avoid collisions while reducing the transmission latency.

Preferred Embodiment 2

In step 1: the network side configures SPS resource information.

Different SPS periods and frequency domain resources are configured for a terminal according to information reported by the terminal. A plurality of transmission opportunities in the SPS period are configured for the terminal. Specifically, a corresponding SPS period is configured for the terminal according to the information reported by the terminal. A base station configures a plurality of transmission opportunities in the period for the terminal. The plurality of transmission opportunities within the period are in a window, and the base station configures a parameter indicating consecutive transmission opportunities in the window. A total time domain length of the plurality of transmission opportunities is less than a length of the window. The base station may indicate the distribution of the transmission opportunities by delivering a window starting position and a bitmap field, or by delivering a combination of the following parameters: the window starting position, a transmission opportunity starting position in a window, a length of the window, the number of the transmission opportunities, a transmission interval, and the like.

In the embodiment, radio resource control (RRC) protocol signaling is used to indicate SPS scheduling configuration information to the terminal. Specifically, the SPS scheduling configuration information is in the SPS-config cell of the RRC signaling, and may include the SPS scheduling period configured to be N TTIs (for example, 100 TTIs), the SPS scheduling resource configuration (including the resource size and resource starting position, etc.) in the period and the modulation and coding scheme (MCS) for transmission. In the embodiment, the indication manner described below may be used: a window starting position, a length of a window and the number of the transmission opportunities (the default transmission opportunity starting position is 0 in all windows for the base); or the window starting position, a transmission opportunity starting position in the window, the length of the window and the number of the transmission opportunities; or the window starting position, the length of the window and a transmission opportunity interval (the default transmission opportunity offset is 0 in all windows for the base station); or the window starting position, the transmission opportunity starting position in the window, the length of the window and the transmission opportunity interval; or the window starting position and a bitmap field are delivered. The base station is able to deliver multiple different configurations to indicate the same distribution of the transmission opportunities, only one of the configurations for indicating the distribution of the transmission opportunities is selected for description by the embodiment, and other configurations are not described in the embodiment.

Figure 10:
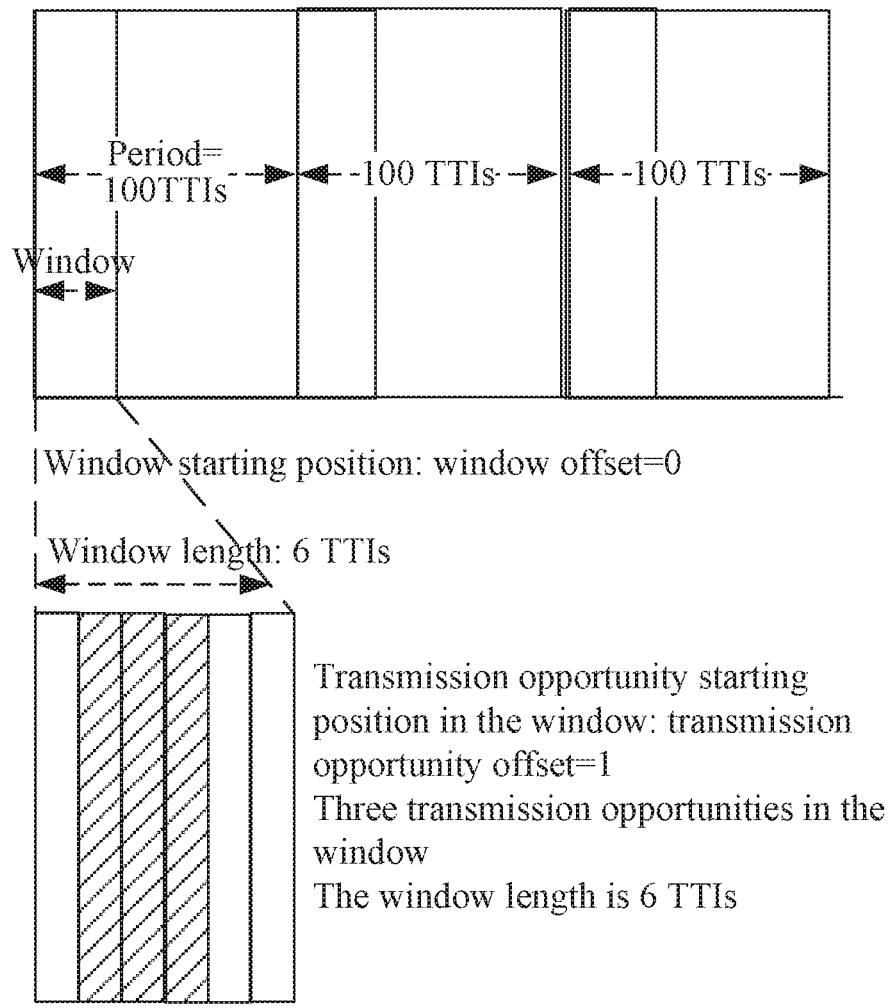
FIG. 10 is a schematic diagram of resource configuration according to a preferred embodiment 2 of the present disclosure.

For example, the base station indicates the distribution of the transmission opportunities by delivering the window starting position, the transmission opportunity starting position in the window, the length of the window and the number of the transmission opportunities. In a configuration made by the base station, the window starting position is the first TTI in the period (that is, the window offset is 0), the transmission opportunity starting position in the window is the second TTI (that is, the transmission opportunity offset in the window is 1), the length of the window is six TTIs, and three transmission opportunities exist in the window. FIG. 10 is a schematic diagram of resource configuration according to the preferred embodiment 2 of the present disclosure. Referring specifically to FIG. 10, if the bitmap indication is used, bitmap=011100.

In step 2, the terminal receives the semi-persistent scheduling configuration information delivered by the network side, and performs corresponding configuration.

In step 3: the terminal receives traffic data, and then determines whether the SPS resource is activated. If the SPS resource is activated, a step 6 is performed; otherwise, a step 4 is performed.

In step 4: the terminal sends a scheduling request to request the network side to activate the SPS resource.

In step 5: the network side delivers SPS activation signaling.

The network sends an SPS activation/reconfiguration message to the terminal (UE) on a physical downlink control channel (PDCCH) according to the scheduling request (SR) reported by the terminal. The terminal obtains a PDCCH scrambled by a SPS C-RNTI, and activates configured transmission opportunities. It should be noted that the activation signaling is valid from the current activation subframe until the terminal receives and executes deactivation signaling, and the activation signaling fails upon the execution of the deactivation signaling.

In step 6: the terminal selects one or more transmission opportunities from the activated transmission opportunities to send corresponding data.

Specifically, in each period, the network side configures and activates a plurality of transmission opportunities for the terminal, and the terminal selects one or more transmission opportunities from the plurality of transmission opportunities. In the period, in determining that the transmission opportunities selected by the terminal is less than the configured transmission opportunities, the terminal may do processing as described below.

The terminal does not send any information in the unselected transmission opportunity (that is, neither the reference signal nor the PUSCH is sent).

Alternatively, the unselected transmission opportunity only includes the first transmission opportunity among the configured transmission opportunities, and the terminal sends the pilot (reference signal) in this transmission opportunity.

Alternatively, the unselected transmission opportunities include the first transmission opportunity and a non-first transmission opportunity among the configured transmission opportunities. The terminal sends the pilot (reference signal) in the first transmission opportunity and at the same time, the terminal does not send any information in the non-first transmission opportunity (that is, neither the reference signal nor the PUSCH is sent).

For example, in the embodiment, three transmission opportunities are configured, the terminal selects the last two transmission opportunities of the three transmission opportunities to send data information (that is, the PUSCH), and the terminal sends only the pilot (reference signal) in the first transmission opportunity.

In step 7: the network side detects, according to the configuration information, the data information sent by the terminal on the corresponding transmission opportunities.

Specifically, the network side locates the corresponding transmission opportunities in the SPS scheduling period according to the configuration information, and detects whether the terminal sends data information in the transmission opportunities in the period. It should be noted that the network side needs to determine whether the terminal sends the reference signal or the data information in the first transmission opportunity in the period, while in other transmission opportunities in the period, the network side only needs to determine whether the terminal sends the data information.

For example, the network side locates the three transmission opportunities in the period according to the window starting position, the transmission opportunity starting position in the window, the length of the window and the number of the transmission opportunities. The network side detects information on the corresponding three transmission opportunities. The data information sent by the terminal is detected on the last two transmission opportunities; and the reference signal is detected on the first transmission opportunity by the network side.

In step 8: the network side deactivates corresponding SPS resource configuration.

Specifically, if no data information needs to be sent in any transmission opportunity in the current period, the terminal sends a null data packet or does not send any data on the SPS resource. The network side deactivate the corresponding SPS resource upon continuously receiving the null packets in the configured SPS subframes or continuously failing to detect the data information sent by the terminal in the configured SPS subframes multiple times.

In the above process, if the base station fails to detect a first-transmitted data packet (which may be a traffic data packet or a null data packet), the base station delivers NACK for the first-transmitted data packet, and the terminal retransmits the packet upon receiving the NACK. This solution adopts a synchronous feedback mode. Since the traffic has a relatively high requirement for latency, a multi-stream processing scheme is adopted. Different transmission data streams are used for the first transmission and the retransmission, which can avoid collisions while reducing the transmission latency.

Preferred Embodiment 3

In step 1: a network side configures SPS resource information.

Different SPS periods and frequency domain resources are configured for a terminal according to information reported by the terminal. A plurality of transmission opportunities in the SPS period are configured for the terminal. Specifically, a corresponding SPS period is configured for the terminal according to the information reported by the terminal. A base station configures a plurality of transmission opportunities in the period for the terminal. The plurality of transmission opportunities are in one window. The transmission opportunities in the window are periodically distributed in only one period. A total time domain length of the plurality of transmission opportunities is less than a length of the window. The base station may indicate the distribution of the transmission opportunities by delivering a window starting position and a bitmap field, or by delivering a combination of parameters such as the window starting position, a transmission opportunity starting position in a window, a length of the window, the number of the transmission opportunities, a transmission interval.

In the embodiment, radio resource control (RRC) protocol signaling is used for indicating SPS scheduling configuration information to the terminal. Specifically, in the SPS-config cell of the RRC signaling, the SPS scheduling period is configured to be N TTIs (for example, 100 TTIs may be configured), and resources (including the resource size and resource starting position, etc.) of the SPS scheduling in the period and the modulation and coding scheme (MCS) for transmission are configured. In the embodiment, the distribution of the transmission opportunities may be indicated in the manners described below. The base station delivers a window starting position and a bitmap field, or delivers the window starting position, a transmission opportunity interval and the number of the transmission opportunities (the default transmission opportunity offset is 0 in all windows for the base station), or delivers the window starting position, a transmission opportunity starting position in the window, the transmission opportunity interval and the number of the transmission opportunities, or delivers the window starting position, a length of the window and the transmission opportunity interval (the default transmission opportunity offset is 0 in all windows for the base station), or delivers the following four fields: the window starting position, the transmission opportunity starting position in the window, the length of the window and the transmission opportunity interval. The base station may use the above different manners to indicate the same distribution of the transmission opportunities, only one of the manners is selected by the embodiment to indicate the distribution of the transmission opportunities for description, and other manners are not described in the embodiment.

Figure 11:
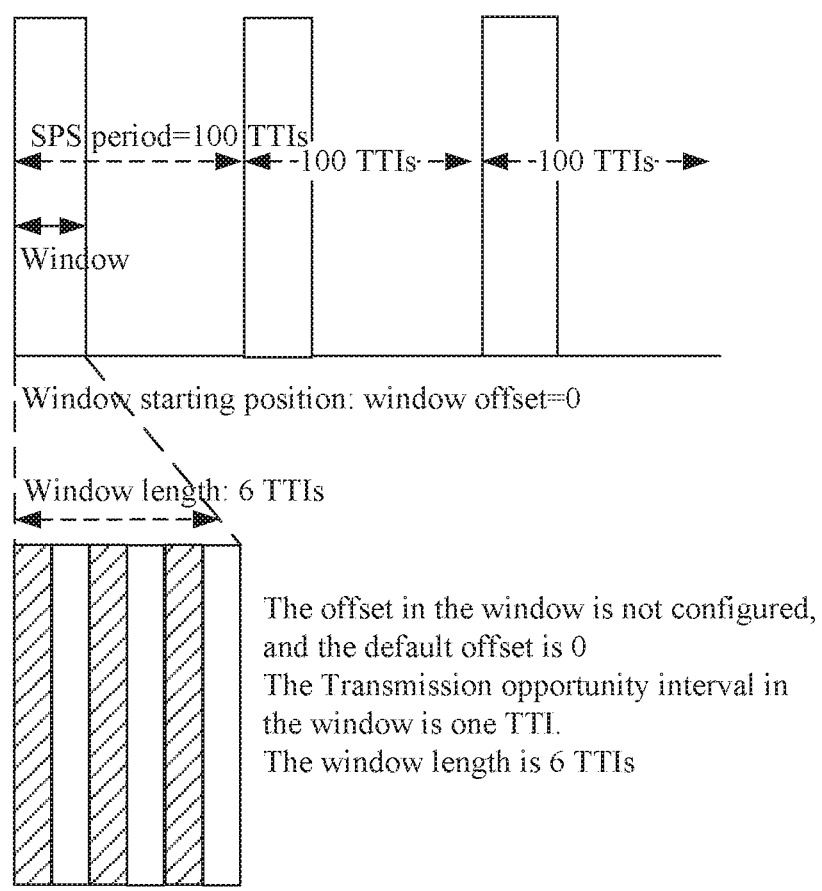
FIG. 11 is a schematic diagram of resource configuration according to a preferred embodiment 3 of the present disclosure.

For example, the base station indicates the distribution of the transmission opportunities by delivering the window starting position, the length of the window and the transmission opportunity interval (the default transmission opportunity offset is 0 in all windows for the base station). The base station configures the window starting position to be the first TTI in the period (that is, the window offset is 0), configures the length of the window in the scheduling period to be six TTIs (the default transmission opportunity offset in the window is 0, that is, the transmission opportunities start from the first TTI in the window), and configures the transmission opportunity interval to be one TTI. FIG. 11 is a schematic diagram of resource configuration according to the preferred embodiment 3 of the present disclosure. The specific resource configuration is shown in FIG. 11.

In step 2: the terminal receives the semi-persistent scheduling configuration information delivered by the network side, and performs corresponding configuration.

In step 3: the terminal receives traffic data, and then determines whether the SPS resource is activated. If the SPS resource is activated, a step 6 is performed; otherwise, a step 4 is performed.

In step 4: the terminal sends a scheduling request to the network side for activating the SPS resource.

In step 5: the network side delivers SPS activation signaling.

The network side sends SPS activation signaling to the terminal (UE) on a physical downlink control channel (PDCCH) according to the scheduling request (SR) reported by the terminal. The terminal obtains a PDCCH scrambled by a SPS C-RNTI, and activates configured transmission opportunities in the corresponding SPS resource. It should be noted that the activation signaling is valid from the current activation subframe, and fails in response to determining that the terminal receives and executes deactivation signaling.

In step 6: the terminal selects one or more transmission opportunities from the activated transmission opportunities to send corresponding data.

Specifically, in each period, the network side configures and activates a plurality of transmission opportunities for the terminal, and the terminal selects one or more transmission opportunities. In the period, if the transmission opportunities selected by the terminal is less than the configured transmission opportunities, the terminal may do processing as described below.

The terminal does not send any information in the unselected transmission opportunity (that is, neither a reference signal nor a PUSCH channel is sent).

In an alternatively embodiment, the unselected transmission opportunity only includes the first transmission opportunity among the configured transmission opportunities, and the terminal sends the pilot (reference signal) in this transmission opportunity.

In another alternatively embodiment, the unselected transmission opportunities include the first transmission opportunity and a non-first transmission opportunity among the configured transmission opportunities. The terminal sends the pilot (reference signal) in the first transmission opportunity but does not send any information in the non-first transmission opportunity (that is, neither reference signal nor the PUSCH is sent).

For example, in the embodiment, the terminal selects the first and the third transmission opportunities of the three transmission opportunities, the terminal sends the data information (that is, the PUSCH) in the first and the third transmission opportunities, but the terminal does not send any information (including the reference signal, the PUSCH channel, and the like) in the second transmission opportunity.

In step 7: the network side detects the data information sent by the terminal on the corresponding transmission opportunities according to the configuration information.

Specifically, the network side locates the corresponding transmission opportunities in the SPS scheduling period according to the configuration, and detects whether the terminal sends the data information in the transmission opportunities in the period. It should be noted that the network side needs to determine whether the terminal sends the reference signal or the data information in the first transmission opportunity in the period. For other transmission opportunities in the period, the network side only needs to determine whether the terminal sends the data information.

For example, the network side locates the corresponding three transmission opportunities in the SPS scheduling period according to the window starting position, the length of the window and the transmission opportunity interval (the default transmission opportunity offset in all windows for the base station is 0), and detects information in the corresponding three transmission opportunities. The data information sent by the terminal is detected only in the first and the third transmission opportunities, and no information is detected on the second transmission opportunity by the network side.

In step 8: the network side deactivates corresponding SPS resource configuration.

Specifically, if the terminal does not need to send any data information in the transmission opportunities in the current period, the terminal sends a null data packet or does not send any data on the SPS resource. The corresponding SPS resource may be deactivated in determining that the network side continuously receives the null packets in the configured SPS subframes or that the network side continuously fails to detect the data information sent by the terminal in the configured SPS subframes multiple times.

In the above process, if the base station fails to detect a first-transmitted data packet (which may be a traffic data packet or a null data packet), the base station delivers a NACK for the first-transmitted data packet, and the terminal retransmits the packet upon receiving the NACK. This solution adopts a synchronous feedback mode. Since the traffic has a relatively high requirement for latency, a multi-stream processing scheme is adopted. Different transmission data streams are used for the first transmission and the retransmission, which can avoid collisions while reducing the transmission latency.

Preferred Embodiment 4

In step 1: a network side configures SPS resource information.

The base station configures a SPS period and frequency domain resource for a terminal according to information reported by the terminal, where different information corresponds to different SPS periods and frequency domain resources. A plurality of transmission opportunities in the SPS period are configured for the terminal. Specifically, according to the information reported by the terminal, the network side configures a SPS period corresponding to the information for the terminal. The base station configures a plurality of transmission opportunities in the SPS period for the terminal. The plurality of transmission opportunities in the SPS period are in one window. The transmission opportunities in the window are non-consecutive, and a total time domain length of the plurality of transmission opportunities is less than a length of the window. The base station may indicate the distribution of transmission opportunities by delivering a window starting position and a bitmap field, or by delivering a predetermined combination of parameters like the window starting position, a transmission opportunity starting position in a window, a length of the window, the number of the transmission opportunities, a transmission interval, and the like.

In the embodiment, radio resource control (RRC) protocol signaling is used for indicating SPS scheduling configuration information to the terminal. Specifically, the SPS scheduling configuration information is indicated by using the SPS-config cell of the RRC signaling, the SPS scheduling period is configured to be N TTIs (for example, 100 TTIs may be configured), and resources (including the resource size and resource starting position, etc.) of the SPS scheduling in the period and the modulation and coding scheme (MCS) for transmission are configured. For example, in the embodiment, the SPS scheduling configuration information may be indicated by a window starting position, a length of a window, the number of the transmission opportunities and a transmission interval (the default transmission opportunity offset in all windows for the base station is 0) which are delivered by the base station to the terminal, or by the window starting position and a bitmap field, and so on. The base station may indicate the same transmission opportunity distribution in multiple different manners, only one of the manners for indicating the transmission opportunity distribution is described in this embodiment, and other manners are not described in this embodiment.

Figure 12:
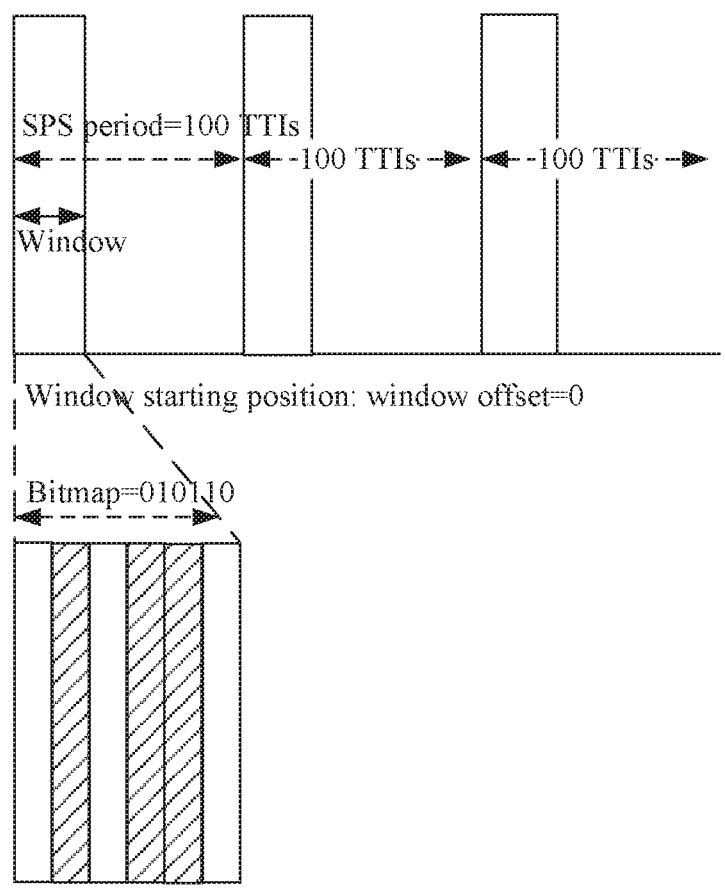
FIG. 12 is a schematic diagram of resource configuration according to a preferred embodiment 4 of the present disclosure.

For example, the base station indicates the distribution of the transmission opportunities by delivering the window starting position and the bitmap field. The base station configures the window starting position to be the first TTI in the period (that is, the window offset is 0), and indicates the distribution of the transmission opportunities in the window through the bitmap. Three non-consecutive transmission opportunities (bitmap=010110) exist in the window. The length of the window is also the length of the bitmap field. FIG. 12 is a schematic diagram of resource configuration according to the preferred embodiment 4 of the present disclosure. The distribution of the transmission opportunities is shown in FIG. 12.

In step 2: the terminal receives the semi-persistent scheduling configuration information delivered by the network side, and performs corresponding configuration.

In step 3: the terminal receives traffic data, and then determines whether the SPS resource is activated. If the SPS resource is activated, a step 6 is performed; otherwise, a step 4 is performed.

In step 4: the terminal sends a scheduling request for requesting the network to activate the SPS resource.

In step 5: the network side delivers SPS activation signaling.

The network sends an SPS activation/reconfiguration message to the terminal (UE) on a physical downlink control channel (PDCCH) according to the scheduling request (SR) reported by the terminal. The terminal obtains a PDCCH scrambled by a SPS C-RNTI, and activates configured transmission opportunities in the corresponding SPS resource. It should be noted that the activation signaling is valid from the current activation subframe, and fails upon determining that the terminal receives and executes deactivation signaling.

In step 6: the terminal selects one or more transmission opportunities from the activated transmission opportunities to send corresponding data.

Specifically, in each period, the network side configures and activates a plurality of transmission opportunities for the terminal, and the terminal selects one or more transmission opportunities from the plurality of transmission opportunities. In the period, if the transmission opportunities selected by the terminal is less than the configured and activated transmission opportunities, the terminal may do processing as described below.

The terminal does not send any information in the unselected transmission opportunity (that is, neither a reference signal nor a PUSCH is sent).

In an alternative embodiment, the unselected transmission opportunity only includes the first transmission opportunity among the configured transmission opportunities, and the terminal sends the pilot (reference signal) in the transmission opportunity.

In another alternative embodiment, the unselected transmission opportunities include the first transmission opportunity and a non-first transmission opportunity among the configured transmission opportunities. The terminal sends the pilot (reference signal) in the first transmission opportunity and does not send any information in the non-first transmission opportunity (that is, neither signal nor the PUSCH is sent).

For example, in the embodiment, the terminal selects the second transmission opportunity of three configured transmission opportunities to send data information (that is, the PUSCH), and the terminal does not send any information (including the reference signal, the PUSCH channel, and the like) in the first and the third transmission opportunities.

In step 7: the network side detects whether there is data information sent by the terminal on the corresponding transmission opportunities according to the configuration information.

Specifically, the network side locates the corresponding transmission opportunities in the SPS scheduling period according to the configuration, and detects whether the terminal sends data information in the transmission opportunities in the period. It should be noted that in other transmission opportunities in the period, the network side only needs to determine whether the terminal sends data information.

For example, the network side locates the corresponding three transmission opportunities in the SPS scheduling period according to the window starting position and the bitmap, and the network side detects whether there is information on the corresponding three transmission opportunities. The data information sent by the terminal is detected only on the second transmission opportunity, and no information is detected on the first and the third transmission opportunities by the network side.

In step 8: the network side deactivates corresponding SPS resource configuration.

Specifically, if the terminal does not need to send any data information in the transmission opportunities in the current period, the terminal sends a null data packet or does not send any data on the SPS resource. The corresponding SPS resource may be deactivated in determining that the network side continuously receives the null packet in the configured SPS subframes or that the network side continuously fails to detect the data information sent by the terminal in the configured SPS subframes multiple times.

In the above process, if the base station fails to detect a first-transmitted data packet (which may be a traffic data packet or a null data packet), the base station delivers a NACK for the first-transmitted data packet, and the terminal retransmits the packet upon receiving the NACK. This solution adopts a synchronous feedback mode. Since the traffic has a relatively high requirement for latency, a multi-stream processing scheme is adopted. Different transmission data streams are used for the first transmission and the retransmission, which can avoid collisions while reducing the transmission latency.

Preferred Embodiment 5

In step 1: a network side configures SPS resource information.

The network side configures different SPS periods and resource sizes for a terminal according to information reported by the terminal. The network side configures a plurality of transmission opportunities in a SPS period for the terminal. Specifically, the network side configures a corresponding SPS period for the terminal according to the information reported by the terminal. The base station configures a plurality of transmission opportunities in the period for the terminal, and the plurality of transmission opportunities in the period are in one window. The plurality of transmission opportunities in the window configured by the base station for the terminal are consecutive or non-consecutive. The base station may indicate the distribution of the transmission opportunities by delivering combinations of parameters like a window starting position, a length of a window, a transmission opportunity starting position in the window, the number of the transmission opportunities and a transmission interval, or by delivering the window starting position and the bitmap.

In the embodiment, radio resource control (RRC) protocol signaling is used to indicate SPS scheduling configuration information to the terminal. Specifically, the SPS scheduling configuration information is indicated using the SPS-config cell of the RRC signaling, and the SPS scheduling configuration information includes the SPS scheduling period which is configured to be N TTIs (for example, 100 TTIs may be configured), and resources (including the resource size and resource starting position, etc.) of the SPS scheduling in the period and the modulation and coding scheme (MCS) for transmission. For example, in the embodiment, the base station may indicate the distribution of the transmission opportunities by delivering the window starting position and the bitmap field, or the like. The base station may indicate the same distribution of the transmission opportunities by delivering various configuration manners, only one of the configuration manners for indicating the distribution of the transmission opportunities is described in this embodiment, and other configuration manners are not described in the embodiment.

Figure 13:
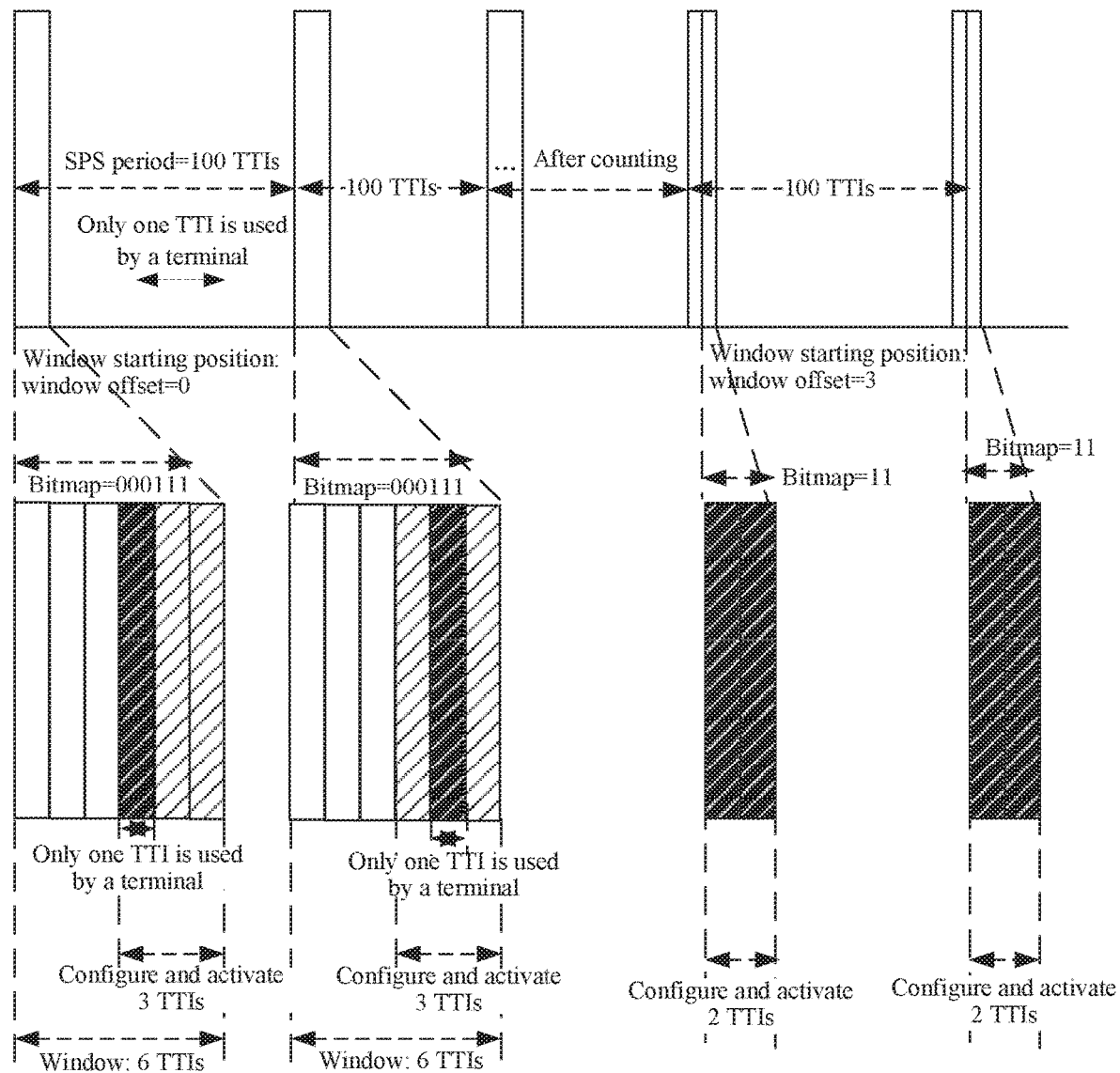
FIG. 13 is a schematic diagram illustrating configuration of consecutive resources according to a preferred embodiment 5 of the present disclosure.
Figure 14:
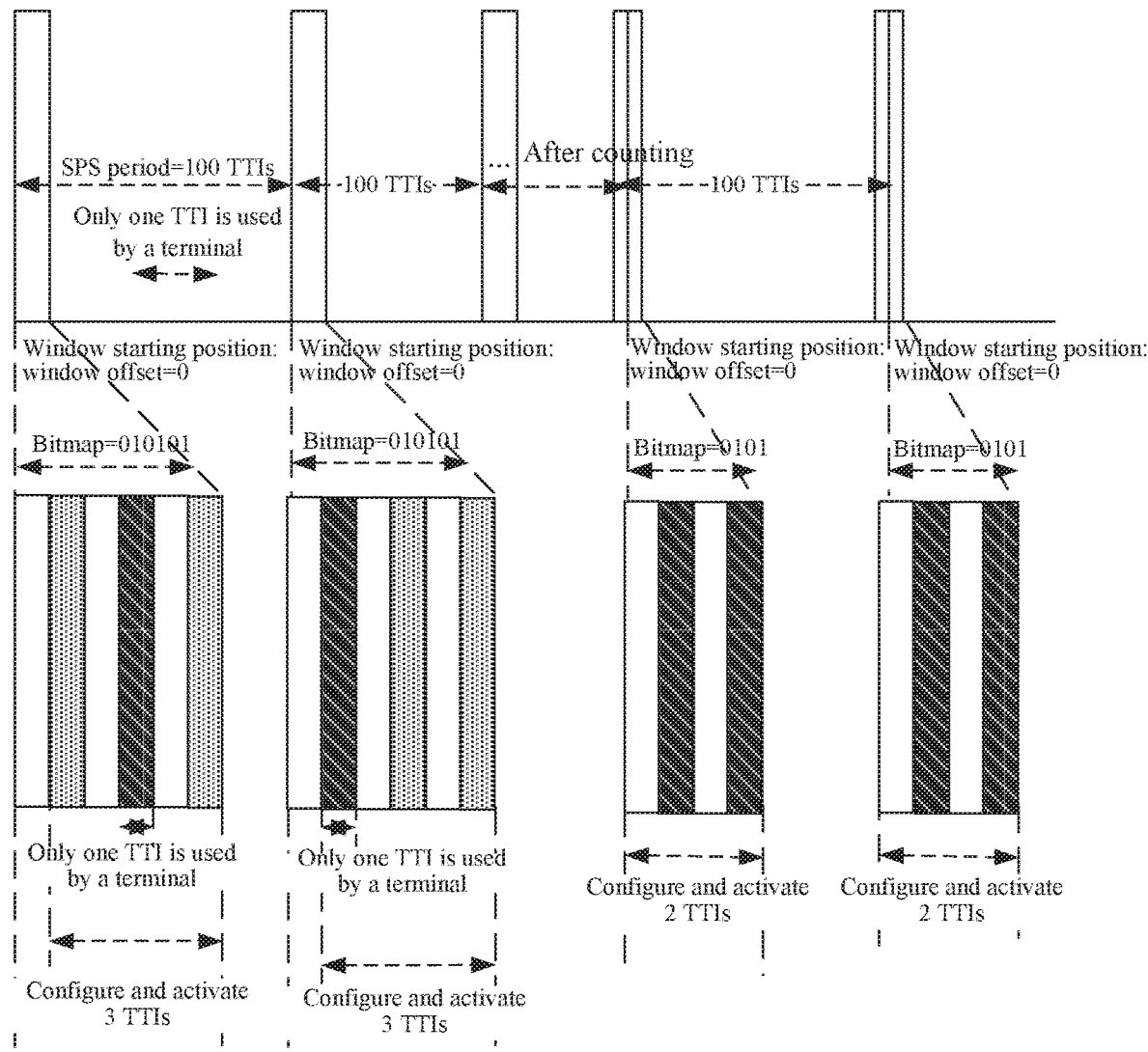
FIG. 14 is a schematic diagram illustrating configuration of non-consecutive resources according to the preferred embodiment 5 of the present disclosure.

For example, the base station indicates the distribution of the transmission opportunities by delivering the window starting position and the bitmap field. The base station configures the window starting position to be the first TTI in the period (that is, the window offset is 0), and indicates the distribution of the transmission opportunities in the window through the bitmap. For example, three transmission opportunities in the window are consecutive and bitmap=000111. FIG. 13 is a schematic diagram illustrating configuration of consecutive resources according to the preferred embodiment 5 of the present disclosure. The three consecutive transmission opportunities are shown in FIG. 13. For another example, three transmission opportunities in the window are non-consecutive and bitmap=010101. FIG. 14 is a schematic diagram illustrating configuration of non-consecutive resources according to the preferred embodiment 5 of the present disclosure. The three non-consecutive transmission opportunities are shown in FIG. 14.

In step 2: the terminal receives the semi-persistent scheduling configuration information delivered by the network side, and performs corresponding configuration.

In step 3, the terminal receives traffic data, and then determines whether the SPS resource is activated. If the SPS resource is activated, a step 6 is performed; otherwise, a step 4 is performed.

In step 4: the terminal sends a scheduling request for requesting the network to activate the SPS resource.

In step 5: the network side delivers the SPS activation signaling.

The network sends SPS activation/reconfiguration signaling to the terminal (UE) on a physical downlink control channel (PDCCH) according to the scheduling request (SR) reported by the terminal. The terminal obtains a PDCCH scrambled by a SPS C-RNTI, and activates configured transmission opportunities in the SPS resource. It should be noted that the activation signaling is valid from the current activation subframe, and fails in response to determining that the terminal receives and executes deactivation signaling or receives reactivation signaling.

In step 6: the terminal selects one or more transmission opportunities from the activated transmission opportunities to send corresponding data.

Specifically, in each period, the network side configures and activates a plurality of transmission opportunities for the terminal, and the terminal selects one or more transmission opportunities from the plurality of transmission opportunities. In the period, if the transmission opportunities selected by the terminal is less than the activated transmission opportunities, the terminal may do processing as described below.

The terminal does not send any information in the unselected transmission opportunity (that is, neither the reference signal nor the PUSCH is sent).

In an alternative embodiment, the unselected transmission opportunity only includes the first transmission opportunity among the activated transmission opportunities, and the terminal sends the pilot (reference signal) in the transmission opportunity.

In another alternative embodiment, the unselected transmission opportunities include the first transmission opportunity and a non-first transmission opportunity among the activated transmission opportunities. The terminal sends the pilot (reference signal) in the first transmission opportunity but does not send any information in the non-first transmission opportunity (that is, neither the reference signal nor the PUSCH is sent).

For example, in the embodiment, the terminal selects one of the three transmission opportunities to send data information (that is, the PUSCH), and the terminal does not send any information (including the reference signal, the PUSCH channel, and the like) in the two unselected transmission opportunities. It should be noted that even if the unselected transmission opportunities include the first transmission opportunity, no information is sent in the first transmission opportunity.

In step 7: the network side detects whether there exists data information sent by the terminal on the corresponding transmission opportunity according to the configuration information.

Specifically, the network side locates the corresponding transmission opportunities in the SPS scheduling period according to the configuration, and detects whether the terminal sends data information in the transmission opportunities in the period. It should be noted that, in the first transmission opportunity in the period, the network side needs to determine whether the terminal sends the reference signal and determine whether the terminal sends the data information, while in other transmission opportunities in the period, the network side only needs to determine whether the terminal sends the data information.

In step 8: the network side counts which transmission resources are used by the terminal. According to the counted transmission resources, the network side may reconfigure the transmission opportunities in a reconfiguration manner and release all the transmission opportunities that are not used by the terminal. The base station redelivers an activation command to activate the configured transmission opportunities. Alternatively, the network side counts the transmission resources used by the terminal. According to the counted transmission resources, the network side delivers a PDCCH scrambled by a SPS C-RNTI to reactivate one or more transmission opportunities among the configured transmission opportunities and releases the transmission opportunities not used by the terminal.

For example, as shown in FIG. 13, the reconfigured window starting position is the fourth TTI in the period (that is, the window offset is 3), the distribution of transmission opportunities in the window is indicated by the bitmap, and bitmap=11. As shown in FIG. 14, the reconfigured window starting position is the first TTI in the period (that is, the window offset is 3), the distribution of transmission opportunities in the window is indicated by the bitmap, and bitmap=0101. The base station redelivers the activation signaling to activate the reconfigured SPS resource, and performs the step 6.

For example, the base station configures three transmission opportunities. According to the counting, the base station determines that the terminal uses only the first two transmission opportunities, and resends PDCCH activation signaling scrambled by the SPS C-RNTI to activate the first two transmission opportunities among the three transmission opportunities, and then performs the step 6. In this way, the utilization rate of resources can be improved.

In step 9: the network side deactivates corresponding SPS resource configuration.

Specifically, if no data information needs to be sent in the transmission opportunities in the current period, the terminal sends a null data packet or does not send any data on the SPS resource. The corresponding SPS resource may be deactivated in determining that the network side continuously receives the null packets in the activated SPS subframes or that the network side continuously fails to detect the data information sent by the terminal in the configured SPS subframes multiple times.

In the above process, if the base station fails to detect a first-transmitted data packet (which may be a traffic data packet or a null data packet), the base station delivers a NACK for the first-transmitted data packet, and the terminal retransmits the packet upon receiving the NACK. This solution adopts a synchronous feedback mode. Since the traffic has a relatively high requirement for latency, a multi-stream processing scheme is adopted. Different transmission data streams are used for the first transmission and the retransmission, which can avoid collisions while reducing the transmission latency.

Preferred Embodiment 6

In step 1: a network side configures SPS resource information.

The network side configures different SPS periods and resource sizes for a terminal according to information reported by the terminal. The network side configures a plurality of transmission opportunities in the SPS period for the terminal. Specifically, the network side configures a SPS period corresponding to the information reported by the terminal for the terminal according to the information reported by the terminal. A base station configures a plurality of transmission opportunities in the SPS period for the terminal. The base station configures parameters to indicate the transmission opportunities. A total time domain length of the plurality of transmission opportunities is less than a length of the SPS period. The base station may indicate the distribution of transmission opportunities by delivering a starting position and the bitmap, or by delivering a transmission starting position, a transmission interval, the number of the transmission opportunities and other parameters.

In the present embodiment, radio resource control (RRC) protocol signaling is used for indicating SPS scheduling configuration information to the terminal. Specifically, the SPS scheduling configuration information is indicated by using the SPS-config cell of the RRC signaling, and the SPS scheduling configuration information includes the SPS scheduling period which is configured to be N TTIs (for example, 100 TTIs may be configured), configured resources (including the resource size and resource starting position, etc.) of the SPS scheduling in the period and the modulation and coding scheme (MCS) for transmission. For example, in the embodiment, the indication may be implemented in a manner of delivering a starting position and the number of the transmission opportunities or by delivering the window starting position and a bitmap field, and so on. The base station may indicate the same distribution of transmission opportunities using different configurations, only one of the configurations for indicating the distribution of the transmission opportunities is described in this embodiment, and other configurations are not described in this embodiment.

Figure 15:
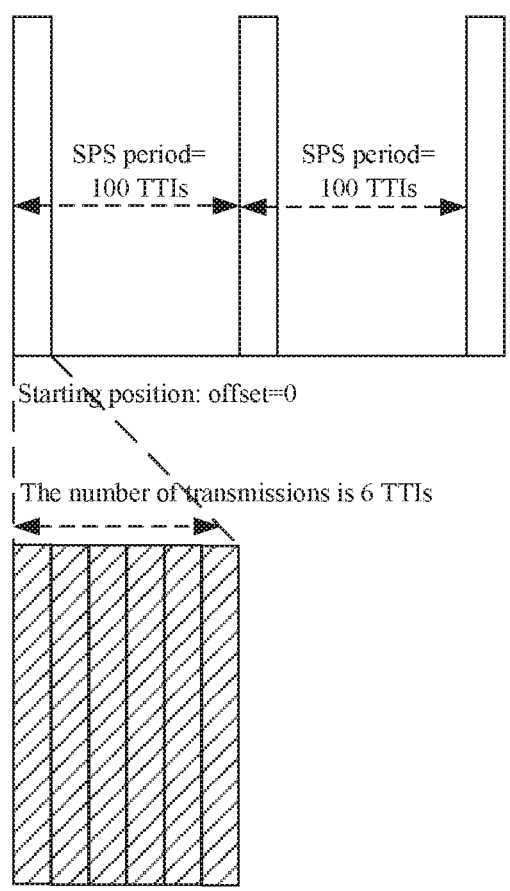
FIG. 15 is a schematic diagram of resource configuration according to a preferred embodiment 6 of the present disclosure.

For example, the base station indicates the distribution of transmission opportunities by delivering the starting position and the number of the transmission opportunities. The starting position is configured to be the first TTI in the period (that is, the starting offset is 0), and the number of the transmission opportunities is configured to be 6 to indicate consecutive transmission opportunities. FIG. 15 is a schematic diagram of resource configuration according to the preferred embodiment 6 of the present disclosure. The 6 consecutive transmission opportunities are shown in FIG. 15.

In step 2: the terminal receives the semi-persistent scheduling configuration information delivered by the network side, and performs corresponding configuration.

In step 3: the terminal receives traffic data, and then determines whether the SPS resource is activated. If the SPS resource is activated, a step 6 is performed; otherwise, a step 4 is performed.

In step 4: the terminal sends a scheduling request for requesting the network to activate the SPS resource.

In step 5: the network side delivers SPS activation signaling.

The network sends an SPS activation/reconfiguration message to the terminal (UE) on a physical downlink control channel (PDCCH) according to the scheduling request (SR) reported by the terminal. The terminal obtains a PDCCH scrambled by a SPS C-RNTI, and activates configured transmission opportunities in the corresponding SPS resource. It should be noted that the activation signaling is valid from the current activation subframe, and fails when the terminal receives and executes deactivation signaling.

In step 6: the terminal selects one or more transmission opportunities from the activated transmission opportunities to send corresponding data.

Specifically, in each period, the network side configures and activates a plurality of transmission opportunities for the terminal, and the terminal selects one or more transmission opportunities from the plurality of transmission opportunities. In the period, if the transmission opportunities selected by the terminal is less than the configured and activated transmission opportunities, the terminal may do processing as described below.

The terminal does not send any information in the unselected transmission opportunity (that is, neither the reference signal nor the PUSCH is sent).

Alternatively, the unselected transmission opportunity only includes the first transmission opportunity among the configured transmission opportunities, and the terminal sends the pilot (reference signal) in the transmission opportunity.

Alternatively, the remaining transmission opportunities include the first transmission opportunity and a non-first transmission opportunity among the configured transmission opportunities. The terminal sends the pilot (reference signal) in the first transmission opportunity but does not send any information in the non-first transmission opportunity (that is, neither the reference signal nor the PUSCH channel is sent).

For example, in the embodiment, the terminal selects the first transmission opportunity among the six transmission opportunities to send data information (that is, the PUSCH), and the terminal does not send any information (including the reference signal, the PUSCH channel, and the like) in the second to fifth transmission opportunities.

In step 7: the network side detects whether there is data information sent by the terminal on the corresponding transmission opportunities according to the configuration information.

Specifically, the network side locates the corresponding transmission opportunities in the SPS scheduling period according to the configuration, and detects whether the terminal sends the data information in the transmission opportunities in the period. It should be noted that, in the first transmission opportunity in the period, the network side needs to determine whether the terminal sends the reference signal or the data information, while in other transmission opportunities in the period, the network side only needs to determine whether the terminal sends the data information.

For example, the network side locates the six transmission opportunities in the SPS scheduling period according to the starting position and the number of the transmission opportunities. The network side detects whether there is information on the corresponding six transmission opportunities. The data information sent by the terminal is detected by the network side only in the first transmission opportunity, and no information is detected by the network side on the second to fifth transmission opportunities.

In step 8: the network side deactivates corresponding SPS resource configuration.

Specifically, if no data information needs to be sent in the transmission opportunities in the current period, the terminal sends a null data packet or does not send any data on the SPS resource. The network side deactivates the corresponding SPS resource, upon continuously receiving the null packets in the configured SPS subframes or continuously failing to detect data information sent by the terminal in the configured SPS subframes multiple times.

In the above process, if the base station fails to detect a first-transmitted data packet (which may be a traffic data packet or a null data packet), the base station delivers a NACK for the first-transmitted data packet, and the terminal retransmits the packet upon receiving the NACK. This solution adopts a synchronous feedback mode. Since the traffic has a relatively high requirement for latency, a multi-stream processing scheme is adopted. Different transmission data streams are used for the first transmission and the retransmission, which can avoid collisions while reducing the transmission latency.

Preferred Embodiment 7

In step 1: a network side configures SPS resource information.

The network side configures different SPS periods and frequency domain resources for a terminal according to information reported by the terminal. The network side configures a plurality of transmission opportunities in the SPS period for the terminal. Specifically, the network side configures a corresponding SPS period and the like for the terminal according to the information reported by the terminal. The base station configures the plurality of non-consecutive transmission opportunities in the period for the terminal, and the plurality of transmission opportunities are indicated by a bitmap.

Figure 16:
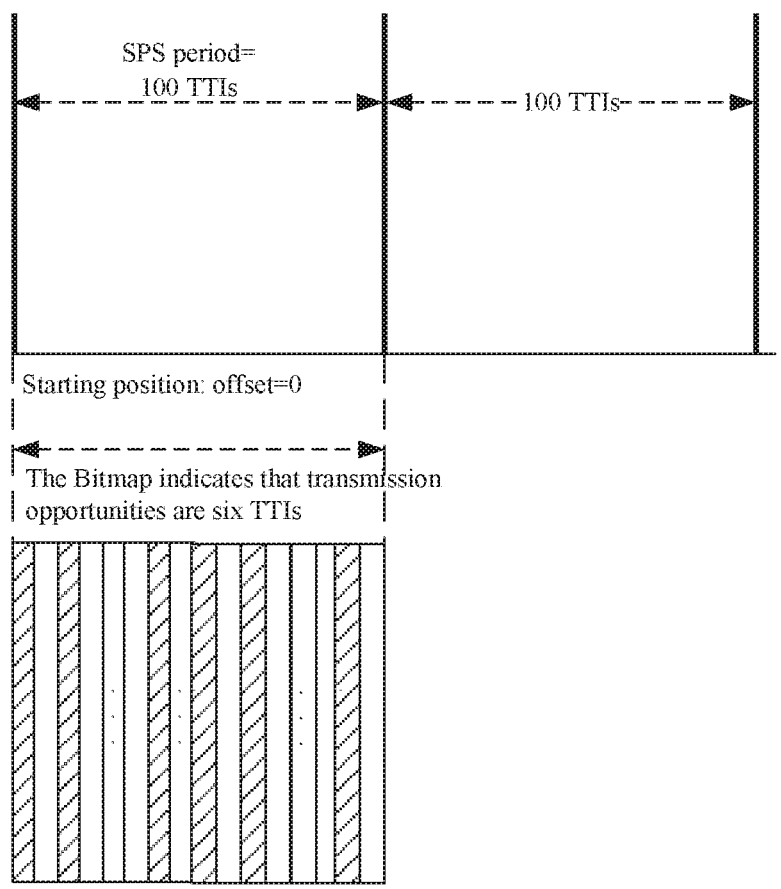
FIG. 16 is a schematic diagram of resource configuration according to a preferred embodiment 7 of the present disclosure.

In the embodiment, radio resource control (RRC) protocol signaling is used for indicating SPS scheduling configuration information to the terminal. Specifically, the SPS scheduling configuration information is indicated using the SPS-config cell of the RRC signaling, and the SPS scheduling configuration information includes the SPS scheduling period which is configured to be N TTIs (for example, 100 TTIs may be configured), configured resources (including the resource size and resource starting position, etc.) of the SPS scheduling in the period and the modulation and coding scheme (MCS) for transmission. For example, the base station delivers the starting position and the bitmap to indicate the distribution of transmission opportunities. In the embodiment, the starting position is configured to be the first TTI in the period (that is, the offset is 0). The transmission opportunities are non-consecutive and are indicated by a bitmap (100 bits). FIG. 16 is a schematic diagram of resource configuration according to the preferred embodiment 7 of the present disclosure. The non-consecutive transmission opportunities are shown in FIG. 16.

In step 2: the terminal receives the semi-persistent scheduling configuration information delivered by the network side, and performs corresponding configuration.

In step 3: the terminal receives traffic data, and then determines whether the SPS resource is activated. If the SPS resource is activated, a step 6 is performed; otherwise, a step 4 is performed.

In step 4: the terminal sends a scheduling request for requesting the network to activate the SPS resource.

In step 5: the network side delivers an SPS activation command.

The network sends an SPS activation/reconfiguration message to the terminal (UE) on a physical downlink control channel (PDCCH) according to the scheduling request (SR) reported by the terminal. The terminal obtains a PDCCH scrambled by a SPS C-RNTI, and activates configured transmission opportunities in the corresponding SPS resource. It should be noted that the activation signaling is valid from the current activation subframe, and fails when the terminal receives and executes deactivation signaling.

In step 6: the terminal selects one or more transmission opportunities from the activated transmission opportunities to send corresponding data.

Specifically, in each period, the network side configures and activates a plurality of transmission opportunities for the terminal, and the terminal selects one or more transmission opportunities from the activated transmission opportunities. In the period, if the transmission opportunities selected by the terminal is less than the configured and activated transmission opportunities, the terminal may do processing as described below.

The terminal does not send any information in the unselected transmission opportunity (that is, neither a reference signal nor a PUSCH is sent).

Alternatively, the unselected transmission opportunity only includes the first transmission opportunity among the configured and activated transmission opportunities, and the terminal sends the pilot (reference signal) in the transmission opportunity.

Alternatively, the unselected transmission opportunities include the first transmission opportunity and a non-first transmission opportunity among the configured transmission opportunities. The terminal sends the pilot (reference signal) in the first transmission opportunity but does not send any information in the non-first transmission opportunity (that is, neither the reference signal nor the PUSCH is sent).

For example, in the embodiment, the terminal selects the first transmission opportunity among the six transmission opportunities to send data information (that is, the PUSCH), and the terminal does not send any information (including the reference signal, the PUSCH, and the like) in the second to fifth transmission opportunities.

In step 7: the network side detects whether there is data information sent by the terminal on the corresponding transmission opportunities according to the configuration information.

Specifically, the network side locates the corresponding transmission opportunities in the SPS scheduling period according to the configuration, and detects whether the terminal sends the data information in the transmission opportunities in the period. It should be noted that, in the first transmission opportunity in the period, the network side needs to determine whether the terminal sends the reference signal and determine whether the terminal sends the data information, while in other transmission opportunities in the period, the network side only needs to determine whether the terminal sends the data information.

For example, the network side locates the six transmission opportunities in the SPS scheduling period according to the starting position and the bitmap. The network side detects whether there is information on the corresponding six transmission opportunities. The data information sent by the terminal is detected by the network side only on the first transmission opportunity; and no information is detected on the second to fifth transmission opportunities.

In step 8: the network side deactivates corresponding SPS resource configuration.

Specifically, if no data information needs to be sent in the transmission opportunities in the current period, the terminal sends a null data packet or does not send any data on the SPS resource. The network side deactivates the corresponding SPS resource upon continuously receiving the null packets in the configured SPS subframes or continuously failing to detect any data information sent the terminal in the configured SPS subframes multiple times.

In the above process, if the base station fails to detect a first-transmitted data packet (which may be a traffic data packet or a null data packet), the base station delivers a NACK for the first-transmitted data packet, and the terminal retransmits the packet upon receiving the NACK. This solution adopts a synchronous feedback mode. Since the traffic has a relatively high requirement for latency, a multi-stream processing scheme is adopted. Different transmission data streams are used for the first transmission and the retransmission, which can avoid collisions while reducing the transmission latency.

Preferred Embodiment 8

In step 1: a network side configures SPS resource information.

The network side configures different SPS periods and frequency domain resources for a terminal according to information reported by the terminal. The network side configures a plurality of transmission opportunities in the SPS period for the terminal. Specifically, the network side configures a corresponding SPS period for the terminal according to the information reported by the terminal. A base station configures a plurality of consecutive or non-consecutive transmission opportunities in the period for the terminal. The plurality of transmission opportunities are indicated by a starting position and a bitmap which are delivered by the base station. Alternatively, the distribution of the transmission opportunities is indicated by a transmission starting position, a transmission interval, the number of the transmission opportunities and other parameters delivered by the base station.

In the embodiment, radio resource control (RRC) protocol signaling is used for indicating the SPS scheduling configuration information to the terminal. Specifically, the SPS scheduling configuration information is indicated using the SPS-config cell of the RRC signaling, and the SPS scheduling configuration information includes the SPS scheduling period which is configured to be N TTIs (for example, 100 TTIs may be configured), configured resources (including the resource size and resource starting position, etc.) of the SPS scheduling in the period and the modulation and coding scheme (MCS) for transmission. For example, the base station indicates the distribution of transmission opportunities by delivering the starting position and the bitmap.

Figure 17:
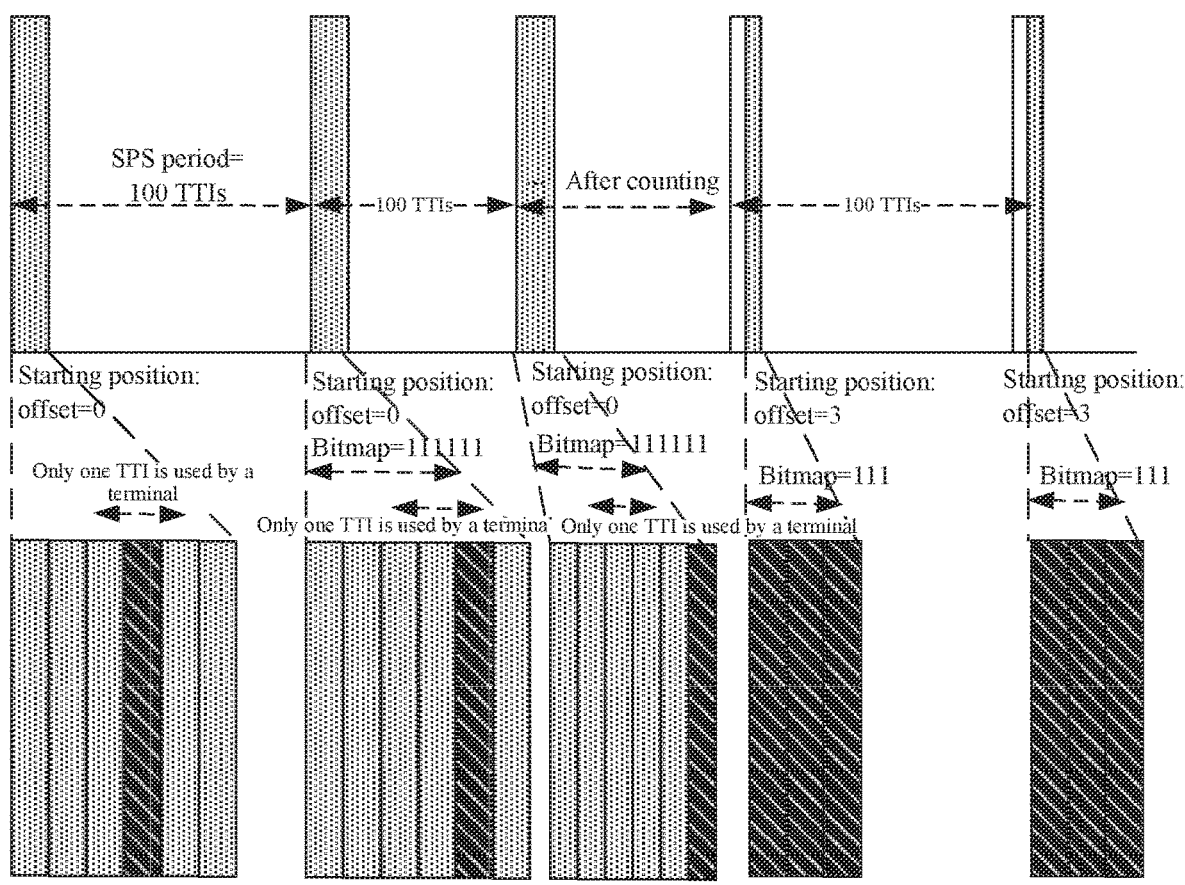
FIG. 17 is a schematic diagram illustrating configuration of consecutive resources according to a preferred embodiment 8 of the present disclosure.
Figure 18:
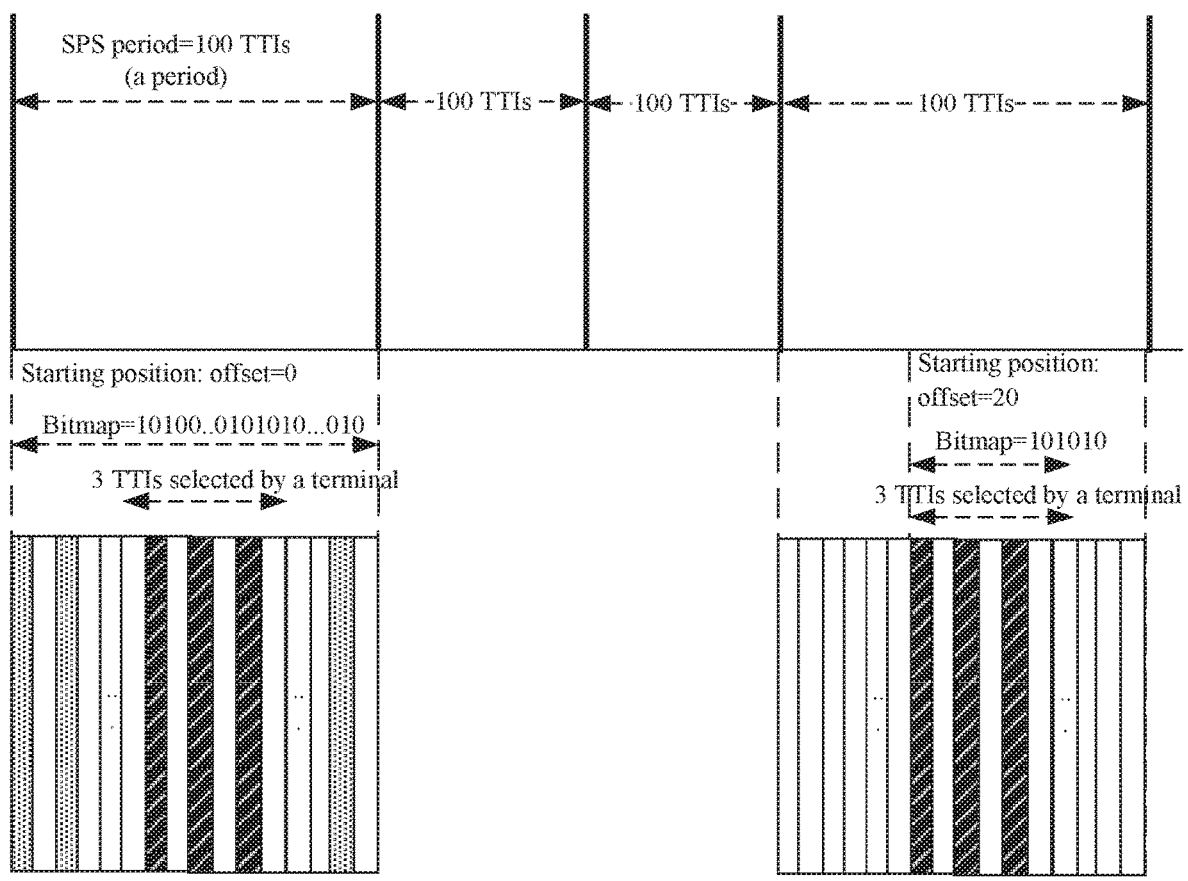
FIG. 18 is a schematic diagram illustrating configuration of non-consecutive resources according to the preferred embodiment 8 of the present disclosure.

If the transmission opportunities are consecutive and the starting position of the transmission opportunities is configured to be the first TTI in the period (that is, the starting offset is 0), bitmap=111111. FIG. 17 is a schematic diagram illustrating configuration of consecutive resources according to the preferred embodiment 8 of the present disclosure. The consecutive transmission opportunities are shown in FIG. 17. If the transmission opportunities are non-consecutive and the starting position of the transmission opportunities is configured to be the first TTI in the period (that is, the offset is 0), the bitmap is 100 bits indicating six transmission opportunities. FIG. 18 is a schematic diagram illustrating configuration of non-consecutive resources according to the preferred embodiment 8 of the present disclosure. The six transmission opportunities are shown in FIG. 18.

In step 2: the terminal receives the semi-persistent scheduling configuration information delivered by the network side, and performs corresponding configuration.

In step 3: the terminal receives traffic data, and then determines whether the SPS resource is activated. If the SPS resource is activated, a step 6 is performed; otherwise, a step 4 is performed.

In step 4: the terminal sends a scheduling request for requesting the network to activate the SPS resource.

In step 5: the network side delivers the SPS activation signaling.

The network sends an SPS activation/reconfiguration message to the terminal (UE) on a physical downlink control channel (PDCCH) according to the scheduling request (SR) reported by the terminal. A PDCCH scrambled by the SPS C-RNTI can activate the configured transmission opportunities. It should be noted that the activation signaling is valid from the current activation subframe, and fails when the terminal receives and executes deactivation signaling or reactivation signaling.

In step 6: the terminal selects one or more transmission opportunities only from the activated transmission opportunities to send corresponding data.

Specifically, in each period, the network side configures and activates a plurality of transmission opportunities for the terminal, and the terminal selects one or more transmission opportunities from the activated transmission opportunities. In the period, if the transmission opportunities selected by the terminal is less than the activated transmission opportunities, the terminal may do processing as described below.

The terminal does not send any information in the unselected transmission opportunity (that is, neither a reference signal nor a PUSCH is sent).

Alternatively, the unselected transmission opportunity only includes the first transmission opportunity among the activated transmission opportunities, and the terminal sends the pilot (reference signal) in the transmission opportunity.

Alternatively, the unselected transmission opportunities include the first transmission opportunity and a non-first transmission opportunity among the activated transmission opportunities. The terminal sends the pilot (reference signal) in the first transmission opportunity but does not send any information in the non-first transmission opportunity (that is, neither the reference signal or the PUSCH is sent).

For example, in the embodiment, the terminal selects one of the six transmission opportunities to send data information (that is, the PUSCH), and the terminal does not send any information (including the reference signal, the PUSCH channel, and the like) in the unselected five transmission opportunities. It should be noted that even if the unselected transmission opportunities include the first transmission opportunity, no information is sent in the first transmission opportunity.

In step 7: the network side detects whether there is data information sent by the terminal in the corresponding transmission opportunities according to the configuration information.

Specifically, the network side locates the corresponding transmission opportunities in the SPS scheduling period according to the configuration, and detects whether the terminal sends the data information in the transmission opportunities in the period. It should be noted that, in the first transmission opportunity in the period, the network side needs to determine whether the terminal sends the reference signal and determine whether the terminal sends the data information, and in other transmission opportunities in the period, the network side only needs to determine whether the terminal sends the data information.

In step 8: the network side determines which transmission resources are used by the terminal. According to the determined transmission resources, the network side may reconfigure the transmission opportunities in a reconfiguration manner and release all the transmission opportunities that are not used by the terminal. The base station redelivers an activation command to activate the configured transmission opportunities. Alternatively, the network side determines which transmission resources are used by the terminal. According to the determined transmission resources, the network side redelivers a PDCCH scrambled by the SPS C-RNTI to reactivate one or more transmission opportunities among the configured transmission opportunities and release the transmission opportunities not used by the terminal.

For example, the base station may reconfigure the plurality of transmission opportunities in a reconfiguration manner. As shown in FIG. 17, the redelivered starting position is the fourth TTI in the period (that is, the offset is 3), the distribution of transmission opportunities is indicated by a bitmap, and bitmap=111. As shown in FIG. 18, the redelivered starting position is the 21st TTI in the period (that is, the offset is 20), the distribution of transmission opportunities is indicated by the bitmap, and bitmap=101010. The base station redelivers the activation command to activate the configured transmission opportunities.

For example, the network side configured six transmission opportunities. It is determined that the terminal used only the last three transmission opportunities. Therefore, the PDCCH scrambled by the SPS C-RNTI may be redelivered to activate the last three transmission opportunities. In this way, the utilization rate of resources can be improved.

In step 9: the network side deactivates corresponding SPS resource configuration.

Specifically, if no data information needs to be sent in any transmission opportunities in the current period, the terminal sends a null data packet or does not send any data on the SPS resource. The corresponding SPS resource may be deactivated in determining that the network side continuously receives the null packets in the configured SPS subframes or that the network side continuously fails to detect the data information sent by the terminal in the configured SPS subframes multiple times.

In the above process, if the base station fails to detect a first-transmitted data packet (which may be a traffic data packet or a null data packet), the base station delivers a NACK for the first-transmitted data packet, and the terminal retransmits the packet upon receiving the NACK. This solution adopts a synchronous feedback mode. Since the traffic has a relatively high requirement for latency, a multi-stream processing scheme is adopted. Different transmission data streams are used for the first transmission and the retransmission, which can avoid collisions while reducing the transmission latency.

Preferred Embodiment 9

Figure 19:
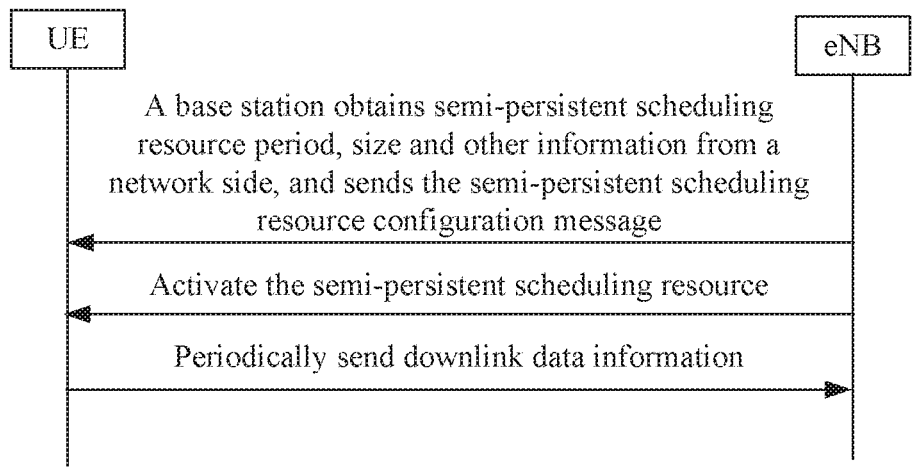
FIG. 19 is a schematic diagram of downlink SPS scheduling according to a preferred embodiment 9 of the present disclosure.

FIG. 19 is a schematic diagram of downlink SPS scheduling according to the preferred embodiment 9 of the present disclosure. The downlink SPS scheduling includes the steps described below.

In step 1: a network side configures SPS resource information.

The base station may obtain information required for the downlink SPS scheduling from the network side. The information is the SPS frequency domain resource and SPS period required for the downlink traffic. Specifically, the information may be obtained by parsing the QoS Class Identifier (QCI) in the bearer setup request message. The base station sends configuration information to the terminal. The configuration information includes the SPS period and a resource size. In the period, a plurality of receiving opportunities are configured for the terminal. Specifically, for the configuration of the receiving opportunities, reference is made to the preferred embodiments 1 to 8.

In step 2: the terminal receives the semi-persistent scheduling configuration information delivered by the network side, and performs corresponding configuration.

In step 3: the network side receives traffic data, and then determines whether the SPS resource is activated. If the SPS resource is activated, a step 5 is performed; otherwise, a step 4 is performed.

In step 4: the network side delivers an SPS activation command.

The network side sends downlink SPS activation/reconfiguration signaling to the terminal (UE) on a physical downlink control channel (PDCCH).

In step 5: the network side selects one or more transmission opportunities from a plurality of transmission opportunities to send corresponding data.

For details, reference is made to the preferred embodiments 1 to 8.

In step 6: the terminal side detects, in all transmission opportunities, whether corresponding downlink traffic exists.

Specifically, For the process of detecting the downlink traffic by the terminal, the SPS resource deactivation and retransmission process, reference is made to the preferred embodiments1 to 8.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatuses, so that the modules or steps may be stored in a storage device and executable by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

INDUSTRIAL APPLICABILITY

Based on the above-mentioned technical solutions provided by the present disclosure, the semi-persistent scheduling information for indicating N transmission opportunities in a semi-persistent scheduling period is sent to the terminal, so that the configured SPS scheduling period includes a plurality of transmission opportunities and the terminal can use M transmission opportunities of them to send data or detect whether corresponding downlink traffic exists. Compared with the existing art in which an SPS scheduling period includes one transmission opportunity, the latency in the SPS scheduling can be reduced, so that the problem that the semi-persistent scheduling cannot meet the requirement of low latency in the related art can be solved, and scheduling flexibility is improved.

What is claimed is:

1. A method for receiving information, comprising:
receiving, by a terminal, semi-persistent scheduling information for indicating N times of transmission opportunities in each semi-persistent scheduling period of a plurality of semi-persistent scheduling periods sent by a base station, wherein the N times of transmission opportunities comprise M times of transmission opportunities for transmitting data by a sending end; wherein N is an integer greater than 1, M is an integer, and 0<M≤N;
wherein the M times of transmission opportunities are selected from the N times of transmission opportunities by the sending end;
wherein the semi-persistent scheduling information further comprises indication information for indicating one transmission opportunity window where the N times of transmission opportunities are located; and
wherein each of the N times of transmission opportunities comprises a transmission subframe or a transmission time interval.

2. The method of claim 1, wherein a value of M is at least one of:
a constant, configured by a system, and determined by the sending end.

3. The method of claim 1, wherein the semi-persistent scheduling information comprises one of:
a starting position of the transmission opportunity window;
the starting position of the transmission opportunity window and a length of the transmission opportunity window;
the starting position of the transmission opportunity window, the length of the transmission opportunity window and a transmission opportunity interval;
the starting position of the transmission opportunity window, the length of the transmission opportunity window and a number of transmission opportunities within the transmission opportunity window;
the starting position of the transmission opportunity window, the transmission opportunity interval and the number of transmission opportunities within the transmission opportunity window;
the starting position of the transmission opportunity window, a transmission opportunity starting position in the transmission opportunity window and the length of the transmission opportunity window;
the starting position of the transmission opportunity window, the transmission opportunity starting position in the transmission opportunity window, the length of the transmission opportunity window and the transmission opportunity interval;
the starting position of the transmission opportunity window, the transmission opportunity starting position in the transmission opportunity window, the length of the transmission opportunity window and the number of transmission opportunities within the transmission opportunity window; and
the starting position of the transmission opportunity window, the transmission opportunity starting position in the transmission opportunity window, the transmission opportunity interval and the number of transmission opportunities within the transmission opportunity window.

4. The method of claim 1, wherein the semi-persistent scheduling information comprises a transmission opportunity indication bitmap; or comprises a starting position of the transmission opportunity window and the transmission opportunity indication bitmap.

5. The method of claim 1, wherein the semi-persistent scheduling information comprises one or more transmission opportunity starting positions, or the semi-persistent scheduling information comprises one or more transmission opportunity starting positions for the N times of transmission opportunities and at least one of: a transmission opportunity interval; and a number of transmission opportunities.

6. The method of claim 5, wherein the semi-persistent scheduling information comprises a plurality of transmission opportunity starting positions, and each of the plurality of transmission opportunity starting positions is used for indicating one transmission opportunity or a set of consecutive transmission opportunities among the N times of transmission opportunities.

7. The method of claim 1, wherein the semi-persistent scheduling information further comprises at least one of: adjustment information of a starting position of the N times of transmission opportunities, and adjustment information of the transmission opportunity window.

8. The method of claim 7, wherein the semi-persistent scheduling information further comprises semi-persistent scheduling activation information for indicating activation, deactivation, reactivation, or release of a part of or all of the N times of transmission opportunities.

9. The method of claim 1, wherein (N−M) times of transmission opportunities, among the N times of transmission opportunities and other than the M times of transmission opportunities, comprise a transmission opportunity for sending a reference signal.

10. The method of claim 9, wherein the (N−M) times of transmission opportunities comprise a first time transmission opportunity of the N times of transmission opportunities, the first time transmission opportunity is used for sending the reference signal.

11. The method of claim 1, wherein the semi-persistent scheduling information is received in one of the following manners:

radio resource control (RRC) protocol signaling, downlink control information (DCI), and a media access control (MAC) message.

12. A base station, comprising:
a processor, configured to configure semi-persistent scheduling information for indicating N times of transmission opportunities in each semi-persistent scheduling period of a plurality of semi-persistent scheduling periods; wherein the N times of transmission opportunities comprise M times of transmission opportunities for data transmission, wherein N is an integer greater than 1, M is an integer, and 0<M≤N; and
a transmission apparatus, configured to send the configured semi-persistent scheduling information to a terminal;
wherein the processor is configured to select the N times of transmission opportunities from the M times of transmission opportunities;
wherein the semi-persistent scheduling information further comprises indication information for indicating one transmission opportunity window where the N times of transmission opportunities are located; and
wherein each of the N times of transmission opportunities comprises a transmission subframe or a transmission time interval.

13. The base station of claim 12, wherein the semi-persistent scheduling information is configured according to a traffic type of the terminal, different traffic types correspond to different semi-persistent scheduling information, and the transmission apparatus is configured to send data to the terminal via the selected N times of transmission opportunities.

14. The base station of claim 12, wherein the processor is configured to detect whether the terminal sends a reference signal on a first one of M times of transmission opportunities,
wherein the processor is further configured to detect, on each of M times of transmission opportunities, whether the terminal sends data.

15. A terminal, comprising:
a transmission apparatus, configured to receive semi-persistent scheduling information for indicating N times of transmission opportunities in each semi-persistent scheduling period of a plurality of semi-persistent scheduling periods sent by a base station; and
a processor, configured to select N times of transmission opportunities from the M times of transmission opportunities;
wherein N is an integer greater than 1, M is an integer, and 0<M≤N;
wherein the semi-persistent scheduling information further comprises indication information for indicating one transmission opportunity window where the N times of transmission opportunities are located; and
wherein each of the N times of transmission opportunities comprises a transmission subframe or a transmission time interval.

16. The terminal of claim 15, wherein the transmission apparatus is configured to send data to the base station via the selected N times of transmission opportunities.

17. The terminal of claim 15, wherein the N times of transmission opportunities include the first one of the M times of transmission opportunities, and the transmission apparatus is configured to send a reference signal via the first one of the M times of transmission opportunities.

* * * * *